(12) United States Patent
Martin et al.

(10) Patent No.: US 9,374,239 B2
(45) Date of Patent: Jun. 21, 2016

(54) ALARM SYSTEM NETWORK OPERATION

(71) Applicant: SimplexGrinnell LP, Westminster, MA (US)

(72) Inventors: Timothy Martin, Westford, MA (US); Joseph Piccolo, III, Fitzwilliam, NH (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 277 days.

(21) Appl. No.: 14/070,896

(22) Filed: Nov. 4, 2013

(65) Prior Publication Data

US 2015/0124807 A1   May 7, 2015

(51) Int. Cl.
*H04L 12/28* (2006.01)
*H04L 12/42* (2006.01)
*H04L 12/18* (2006.01)
*H04L 12/40* (2006.01)
*H04L 12/701* (2013.01)

(52) U.S. Cl.
CPC ........ *H04L 12/2838* (2013.01); *H04L 12/2827* (2013.01); *H04L 12/40182* (2013.01); *H04L 12/42* (2013.01); *H04L 45/00* (2013.01); *H04L 12/1895* (2013.01)

(58) Field of Classification Search
CPC .. H04L 12/2838; H04L 12/42; H04L 12/1895
See application file for complete search history.

(56) References Cited

U.S. PATENT DOCUMENTS

| 2006/0140226 A1* | 6/2006 | Ho | H04J 3/08 370/539 |
| 2011/0096712 A1* | 4/2011 | Kish | H04W 4/06 370/312 |
| 2015/0055651 A1* | 2/2015 | Shen | H04L 12/1854 370/390 |

\* cited by examiner

*Primary Examiner* — Melvin Marcelo

(57) ABSTRACT

Various embodiments are directed to network controllers coordinating operation of alarm panels, and to an alarm network incorporating multiple alarm panels that each incorporate such a network controller and aspects of the coupling and interactions of those alarm panel components enabled by interactions among those network controllers. An alarm panel includes an alarm controller configured to monitor one or more points for an indication of an alarm condition and a network controller. The network controller includes a proxy server configured to present multiple proxies on an internal network and to receive multiple unicast packets, each proxy of the multiple proxies associated with an alarm panel of multiple alarm panels and each unicast packet of the multiple unicast packets directed to one of the proxies of the multiple proxies; and a multicast component to combine the multiple unicast packets received within a specified interval of time into a multicast packet.

24 Claims, 22 Drawing Sheets

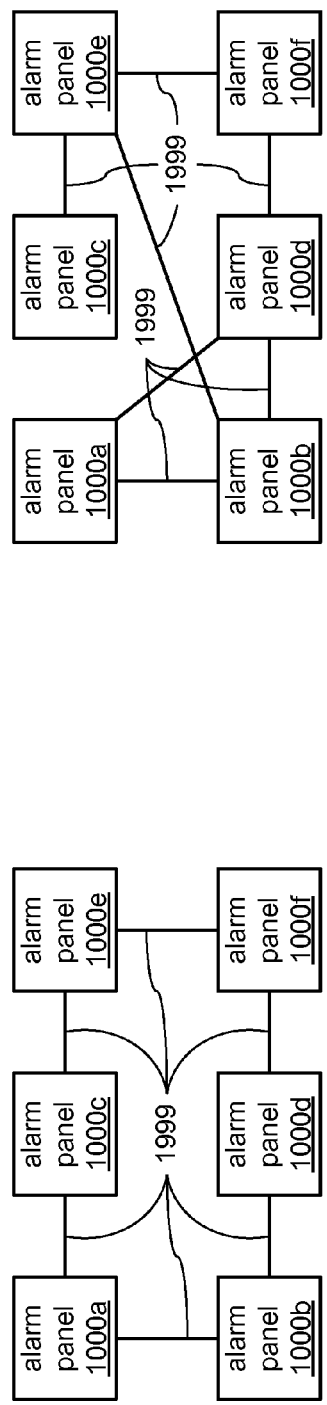
FIG. 2A
FIG. 2B
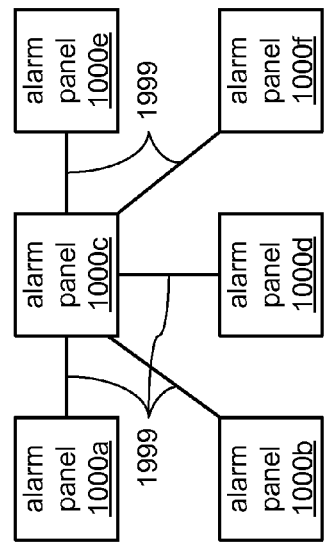
FIG. 2C

ALARM SYSTEM NETWORK OPERATION

TECHNICAL FIELD

Embodiments described herein generally relate to alarm controllers and network controllers within alarm panels employing proxies for other alarm panels and their points to operate an alarm system network among alarm panels.

BACKGROUND

Early fire alarm systems typically included a single alarm panel coupled by wiring within a structure to various smoke detectors, fire alarm pull switches and annunciators to cause an alarm to be sounded upon detection of a fire to effect evacuation of persons from that structure. However, there are limitations associated with the scalability of the use of a single alarm panel in such systems. For example, single alarm panel systems may limit the available distance to detectors, switches and annunciators. Moreover, single alarm panel systems create a single point of failure that may disable alarm panel functionality for the entire system. Thus, larger structures, requirements for more and different types of detectors in each structure, and a desire to communicate the detection of alarm conditions among multiple structures have each necessitated the use of sets of multiple alarm panels linked by an alarm network to enable coordinated operation.

In many places, alarm networks must meet various safety standards for reliability and redundancy to both minimize equipment failures and sufficiently localize the effects of such failures to maintain coordinated operation among multiple alarm panels. In answer to such requirements, alarm networks have typically been formed among multiple alarm panels, whether within a single structure or among multiple structures, in a ring topology with a token-passing protocol to coordinate communications. In other words, alarm networks have typically been made up of point-to-point network segments extending between pairs of alarm panels that become nodes on that network, thereby forming a ring of alarm panel nodes and point-to-point network segments. Such a ring topology provides a redundant path between any two alarm panels on that ring.

However, depending on the circumstances under which an installation of such a network is undertaken, especially where such a network is retrofitted to existing structure(s), there may be difficulty in routing the wiring of the network segments to form a ring due to obstacles and/or distances between alarm panel locations. As a result, in order to form a ring, the lengths of one or more of the segments may need to be so great that data transfer rates are limited to mere kilobits per second. Further, the use of a ring topology can result in a considerable amount of traffic around the ring being slowed down to the data transfer rate of the slowest point-to-point segment in a ring. In at least some situations, it is possible to overcome such obstacles by forming multiple ring topologies and coupling pairs of rings with ring-to-ring bridging devices.

Further, considerable technical skill is required on the part of installation personnel to effectively plan a ring topology alarm network, or to plan an alarm network made up of two or more ring topologies linked by one or more ring-to-ring bridging devices. The need for such technical skill becomes more acute where an existing alarm network is to be augmented with more alarm panels such that locations must be found within an existing ring topology to insert one or more new alarm panels and/or to insert a ring-to-ring bridge to allow the addition of a new ring topology to accommodate new alarm panels. Such augmentation may be necessitated by a change in safety regulations requiring additional sensors, annunciators, pull switches, etc. in an existing structure; renovations made to an existing structure; and/or the addition of a new structure to a campus in which the alarm panels of multiple structures are linked. The training of installation personnel to provide them with the requisite level of skill is expensive. Such difficulties are likely to be exacerbated over time as alarm panels incorporate more capabilities. It is with respect to these and other considerations that the present improvements have been needed.

BRIEF DESCRIPTION OF THE DRAWINGS

FIGS. 2A, 2B and 2C each illustrate an embodiment of an alarm network.

DETAILED DESCRIPTION

Various embodiments are generally directed to a network controller to couple components within an alarm system to an multiple alarm panels. The network controller includes a router-bridge, a network address translator, dual proxy servers, an internal network switch, and various topology and device detectors to couple various components associated with an an alarm panel to an alarm network among multiple alarm panels. These various embodiments are also directed to network controllers coordinating operation among those alarm panels within an alarm network. These various embodiments are further directed to the formation of the alarm network itself among multiple alarm panels that each incorporate such a network controller, and to aspects of the interactions among alarm panel components enabled by interactions among those network controllers.

More specifically, the use of such a network controller enables the formation of an alarm network that may be of any of a variety of topologies, including a topology that may change over time, thereby enabling greater flexibility in installation while still enabling the provision of redundancy in communications among its alarm panels. Such a network controller enables the formation of an alarm network based on passing routing packets between routing bridges in which all of its alarm panels exist as peers to each other on a common subnet, thereby reducing addressing complexity in broadcast and/or multicast network communications. Such a network controller also enables all of such alarm panels to be presented as peers to each other on each internal network implemented within each one of those alarm panels in a manner in which each other panel is represented via a pair of proxies. One of the proxies is presented in a manner that reduces communications complexity in responding to alarm conditions indicated by a sensor, regardless of which alarm panel it is coupled to by serving as a proxy for sensors of another alarm panel. The other of the proxies is presented in a manner that enables separate addressing to support additional features, including remote programming of other alarm panels and voice communications between alarm panels.

Figure 1:
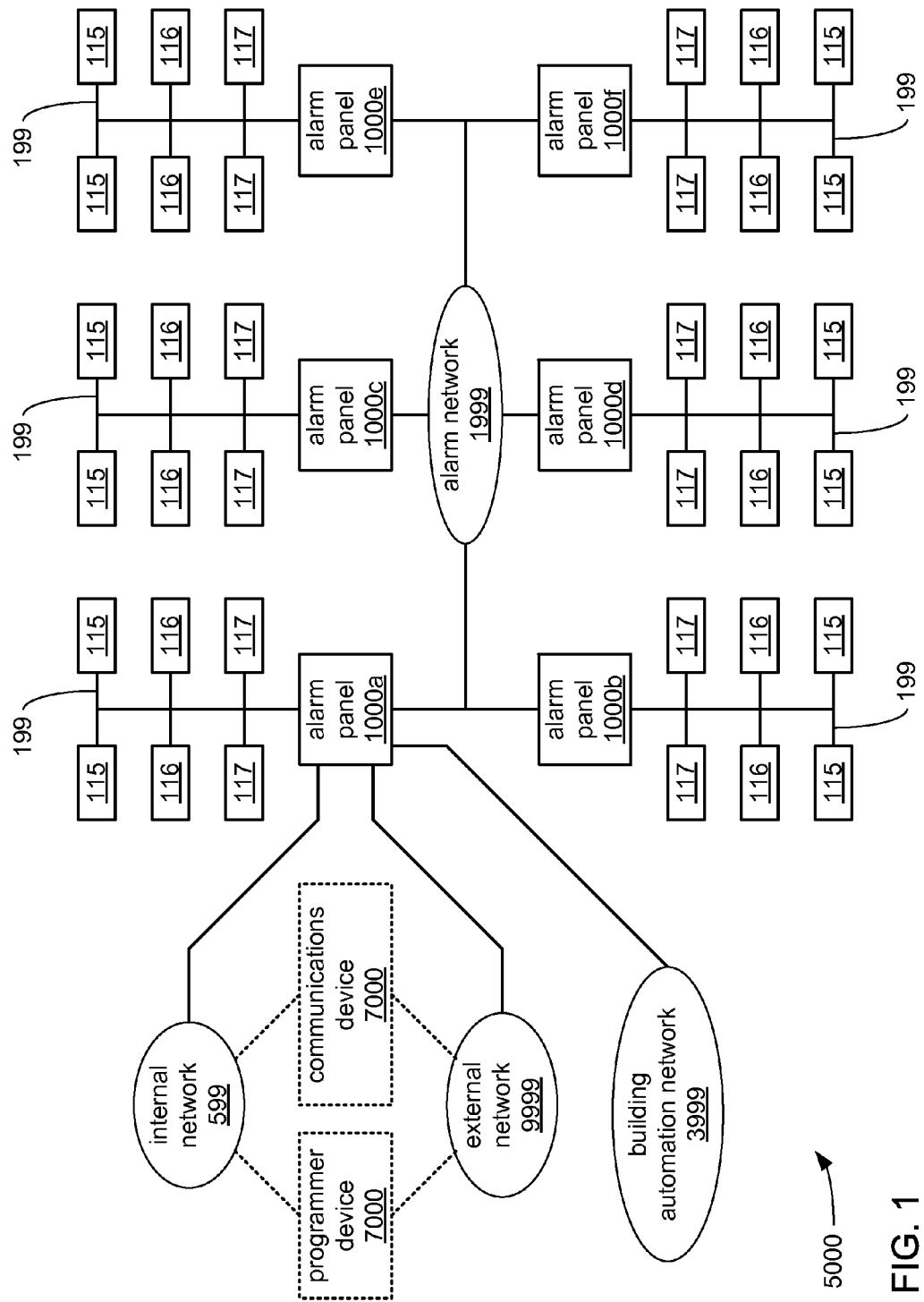
FIG. 1 illustrates an embodiment of an alarm system.

FIG. 1 is a block diagram of an embodiment of an alarm system 5000 incorporating alarm panels 1000*a* through 1000*f* coupled via an alarm network 1999 to detect and communicate alarm conditions to personnel within a structure to enable an appropriate response. An alarm condition may include a fire, a chemical or biological material release, a security breach, a natural disaster, or other untoward event within or in the vicinity of a structure. The alarm network 1999 may extend entirely within a single structure (e.g., a relatively large building) such that all of the alarm panels 1000*a-f* are installed in various locations throughout that structure. Alternatively, the alarm network 1999 may extend among multiple structures (e.g., a campus) such that the alarm panels 1000*a-f* are distributed among those multiple structures. It should be noted that despite the depiction of the specific quantity of six alarm panels, namely the alarm panels 1000*a-f*, the alarm system 5000 may incorporate any of a wide range of quantities of alarm panels coupled to the alarm network 1999. It should also be noted that despite the depiction of the alarm network 1999 as having a bus-like or "multi-drop" topology, this is an intentionally oversimplified depiction provided to do nothing more than to show that the alarm network 1999 is formed among the alarm panels 1000*a-f*. As will be explained in greater detail, the alarm network 1999 may have any of a number of possible topologies, and indeed, may have a topology that dynamically changes over time.

Each of the alarm panels 1000*a-f* is depicted as being coupled via a point coupling 199 to various appliances such as, for example, sensors 115, controls 116 and annunciators 117. The sensors 115, controls 116 and annunciators 117 are commonly referred to collectively as "points" by those skilled in the art of alarm systems. Each of the sensors 115 may be any of a variety of types of sensor, including and not limited to, smoke detectors, heat sensors, chemical toxin sensors, hygrometers, humidistats, seismometers, motion detectors, glass breakage detectors, etc. Each of the controls 116 may be any of a variety of types of manually operable control, including and not limited, fire pull switches, security panic buttons, medical emergency call buttons, etc. Each of the annunciators 117 may be any of a variety of types of alarm indicator, including and not limited to, claxons, strobe lights, bells, buzzers, illuminated signs, alterable alphanumeric signs, speakers to acoustically output alarm-related speech, etc. Each of the point couplings 199 may be any of a variety of type of electrical and/or optical coupling, including and not limited to, fiber optic cabling conveying digitally encoded signals, a digital serial bus, a normally-open circuit, a normally-closed circuit, a circuit monitored for one or more ranges of electrical resistance between a pair of conductors, an electrical circuit capable of conveying audio signals, a radio-frequency transmission conductor, a network, etc.

It should be noted that despite the depiction of similar quantities of the points 115-117 coupled to each of the alarm panels 1000*a-f*, the alarm panels 1000*a-f* may have differing quantities of points attached thereto, including no points, at all. It should also be noted that despite the depiction of each of the alarm panels 1000*a-f* being coupled to a set of the points 115-117 by only a single point coupling 199, each of the alarm panels 1000*a-f* may be coupled through differing quantities of the point couplings 199 to one or more of the points 115-117.

The alarm panel 1000*a* is depicted as optionally coupled to a programmer device 7000 or communications device 7500 either via an internal network 599 of the alarm panel 1000*a* or via an external network 9999. Each of the alarm panels 1000*a-f* incorporates its own internal network 599 by which various components within each of these alarm panels communicate with each other and through which one or more of those components is able to gain access to the alarm network 1999. Also, one or more of the alarm panels 1000*a-f* may optionally be coupled to the external network 9999, where the external network 9999 may be any of a variety of possible networks external to the alarm system 5000, including and not limited to, the Internet, a LAN extending about the same structure as at least a portion of the alarm network 1999, etc. The programmer device 7000 may be coupled to the alarm panel 1000*a* in either of these depicted ways to enable configuration of the alarm panel 1000*a* directly, and/or to enable configuration of one or more of the other alarm panels 1000*b-f* remotely via the alarm network 1999. Alternatively or additionally, the communications device 7500 is able to be coupled to the alarm panel 1000*a* in either of these depicted ways to enable transmission of voice and/or images to and/or from the alarm panel 1000*a* across the alarm network 1999. It should be noted that despite the depiction of the programmer device 7000 and/or the communications devices as being coupled to the alarm panel 1000*a*, either may be coupled to any of the other alarm panels 1000*b-f*.

The alarm panel 1000*a* is also depicted as optionally coupled to a building automation network 3999. This enables the alarm panel 1000*a* to interact with building systems (e.g., environmental, HVAC, etc.) and/or other systems of a structure, possibly in response to an alarm condition. Components of building environmental systems with which the alarm panel 1000*a* may so interact may include heaters, blowers, coolers, air conditioners, air dampers, fans, humidifiers, dehumidifiers, air filters, lighting, water pumps, or other building environmental system components. It should be noted that despite the depiction of the building automation network 3999 as being coupled to the alarm panel 1000*a*, the building automation network 3999 may be coupled to any of the other alarm panels 1000*b-f*, either in addition to or in lieu of being coupled to the alarm panel 1000*a*.

The coupling of the alarm panels 1000*a-f* via the alarm network 1999 enables coordination of activity among the alarm panels 1000*a-f* in both their installation and normal operation. As those skilled in the art will readily recognize, alarm panels must typically be configured through programming to load configuration data and/or a control routine. Such configuration data may include information concerning the number, type, location and/or other characteristics of various points, and/or the configuration data may include information concerning choices of actions to take in response to the detection of various alarm conditions. Such a control routine may include instructions for execution by a processor component of an alarm panel to recurringly monitor various points, recurringly exchange status and/or alarm condition information with other alarm panels, and/or perform various other functions that may include alarm panels and/or points.

With the alarm panels 1000*a-f* configured, the alarm network 1999 enables various ones of the alarm panels 1000*a-f* to signal various others of the alarm panels 1000*a-f* concerning detected alarm conditions, status of various ones of the points 115-117 coupled to each, status of the various ones of the alarm panels 1000*a-f* themselves, etc. Especially where more than one of the alarm panels 1000*a-f* are installed in different portions of the same structure, they are able to signal each other upon detection by one of them of an alarm condition to coordinate actions taken in response, including coordinating the provision of indications to evacuate that structure.

FIGS. 2A, 2B and 2C are each a block diagram of an example network topology that the alarm network 1999 may be given. Specifically, FIG. 2A depicts an example of a ring topology, FIG. 2B depicts an example of a mixed topology, and FIG. 2C depicts an example of a star topology. As will be explained in greater detail, each of the alarm panels 1000a-f is able to be linked to one or more of the others in almost any conceivable arrangement of network segments to form the alarm network 1999.

This flexibility in coupling the alarm panels 1000a-f to form alarm network 1999 enables physical limitations imposed by a physical structures and/or other physical barriers against the physical routing of cabling between specific pairs of the alarm panels 1000a-f. In other words, as long as each of the alarm panels 1000a-f is coupled, either directly or indirectly, to all of the other alarm panels, the alarm network 1999 is then physically formed. Additionally, as long as each of the alarm panels 1000a-f is directly coupled to at least two of the others, then the alarm network 1999 incorporates a degree of redundancy that enables the alarm network 1999 to remain in operation despite the loss of any one network segment extending between any two of the alarm panels 1000a-f.

Figure 3:
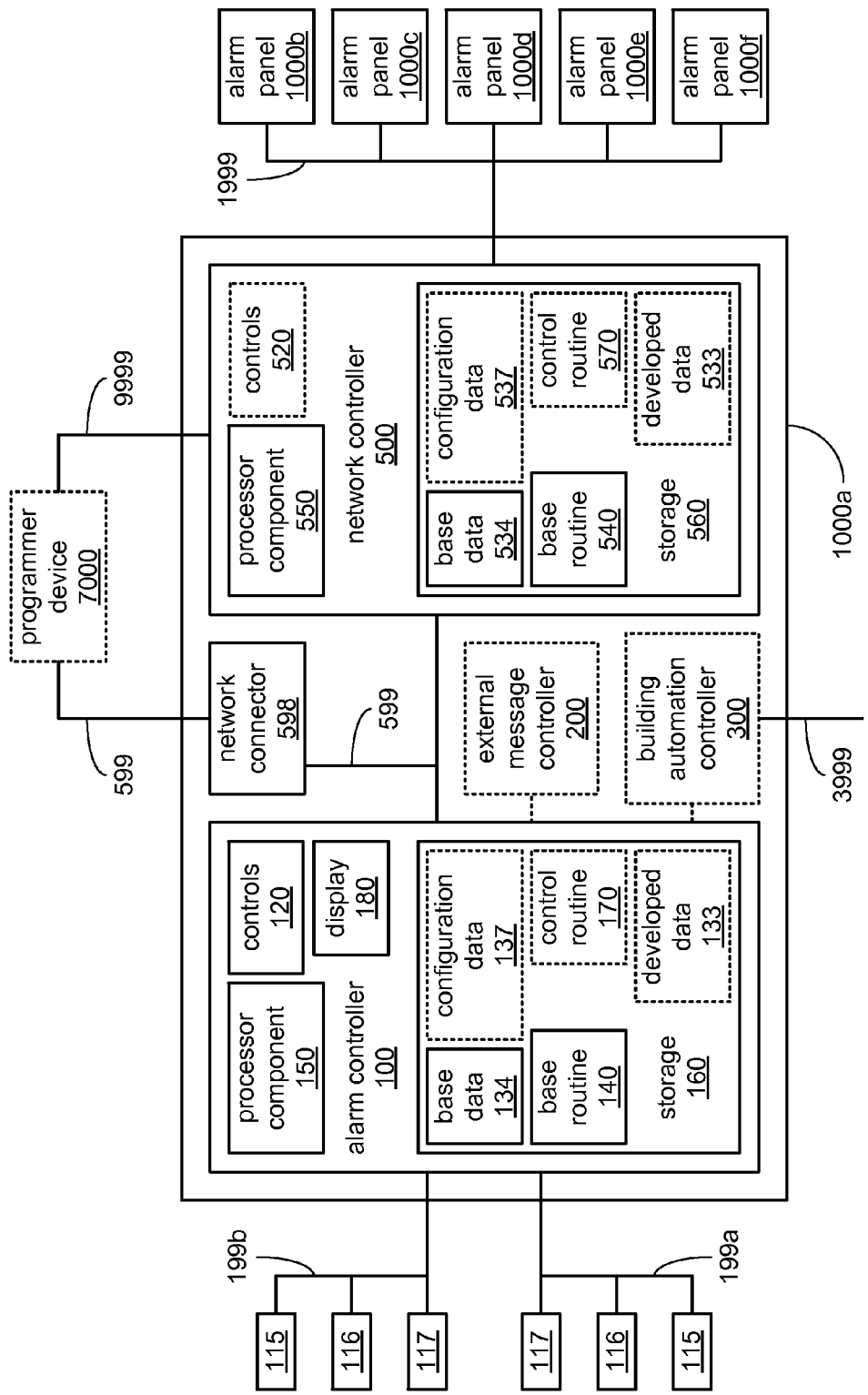
FIGS. 3 and 4 each illustrates an embodiment of an alarm panel.

FIG. 3 is a block diagram of a configuration of components in an example embodiment of the alarm panel 1000a, and the manner in which those components may be coupled to each other and to other devices external to the alarm panel 1000a. However, it is envisioned that more than one, and possibly all, of the alarm panels 1000a-f are made up of a similar configuration of components. As depicted, the alarm panel 1000a may incorporate one or more of an alarm controller 100, an external message controller 200, a building automation controller 300, a network controller 500, and a network connector 598. At least some of these components are coupled to each other via an internal network 599 of the alarm panel 1000a. Further, the network connector 598 enables the internal network 599 to extend externally from within a casing of the alarm panel 1000a to a device external to the alarm panel 1000a, such as the programmer device 7000 or the communications device 7500 as previously discussed.

In various embodiments, the alarm controller 100 incorporates one or more of a processor component 150, a storage 160, controls 120 and a display 180. The storage 160 stores one or more of a base routine 140, a control routine 170, a base data 134, a configuration data 137 and a developed data 133. The controls 120 and the display 180 (if present) may together provide a user interface by which various aspects of at least the alarm controller 100 (and possibly other components of the alarm panel 1000a) may be configured, inspected, tested, etc. The controls 120 may be any of a variety of types of controls, including and not limited to, a keypad. The display 180 may be any of a variety of types of display, including and not limited to, a text-only display able to visually present one or more lines of text, or an all-points-addressable display able to visually present graphical imagery. As depicted, a pair of point couplings 199a and 199b emanate from the alarm controller 100 by which various ones of the points 115, 116 and/or 117 may be coupled to the alarm panel 1000a.

Each of the point couplings 199a and 199b is an instance of the previously discussed point coupling 199, and as previously discussed, may be based on any of a variety of types of electrical and/or optical coupling. However, it is envisioned that one or both of the point couplings 199a-b is implemented as a digital serial bus, possibly conveying electric power, and able to couple the alarm controller 100 to a multitude of points 115-117 In such digital serial bus implementations, each of the points 115-117 is uniquely addressable such that each is able to be individually accessed from the controller 100 by its address for activation, deactivation, testing, configuration, monitoring, etc. More specifically, it is envisioned that each of the points 115-117 is assigned an address on one of the point couplings 199a-b when installed such that each one of the sensors 115 and controls 116 is able to uniquely identify itself to the alarm controller 100 when transmitting information to the alarm controller 100 concerning an alarm condition, and such that each one of the annunciators 117 is able to be individually triggered or otherwise caused to provide an indication to personnel in a specific area within a structure of an alert condition.

It is also envisioned, possibly as a result of accommodating older installations, that one or both of the point couplings 199a-b may be implemented as a simpler normally-open, normally-closed and/or analog signal wire pair. More specifically, multiple ones of the sensors 115 and/or the controls 116 may be coupled to a variant of one of the point couplings 199a-b that includes a simple pair of wires that is monitored by the alarm controller 100 for a degree of electrical resistance therebetween. In such a variant, a relatively low resistance electrical coupling of that pair of wires (e.g., a short between them) may serve as an indication of operation of one of the controls 116 as evidence of a fire having been discovered. Further, a somewhat higher resistance electrical coupling of that pair of wires may serve as an indication of the detection of smoke by one of the sensors 115. Alternatively, multiple ones of the annunciators 117 may be coupled to a variant of one of the point couplings 199a-b that includes a simple pair of wires onto which a signal to operate those annunciators may be driven by the alarm controller 100 in response to an alarm condition. In such a variant, the annunciators 117 may be activated to indicate a need to evacuate a structure by simply driving a voltage onto that pair of wires connecting the annunciators 117 to the alarm controller 100.

In some embodiments of the alarm panel 1000a, the point couplings 199a-b are each implemented as a digital serial bus in anticipation of use in new installations, while the alarm controller is able to be augmented with an interface component providing one or more additional point couplings (not shown) that are implemented as one of the forms of a simple pair of wires to accommodate an installation of the alarm panel 1000a as a retrofit in a situation where one or more of such pairs of wires are already in use. Numerous other possible implementations with varying quantities of point couplings and provision of those point couplings via one or more components of an alarm panel are possible. The network controller 500 incorporates one or more of a processor component 550, a storage 560, and controls 520. The storage 560 stores one or both of a base routine 540, a control routine 570, base data 534, configuration data 537 and developed data 533. As depicted, the network controller 500 is interposed between the internal network 599 of the alarm panel 1000a and the alarm network 1999. It should again be noted that despite the relatively simple depiction of the networks 599 and 1999 herein that might seem to suggest that the each of these networks has something of a bus-like or "multi-drop" physical implementation, these relatively simple depictions should not be taken as being so limiting. Such simple depictions are used to show what is coupled by each of these networks without causing visual clutter by depicting details of exact topologies. Indeed, it is envisioned that one or both of these networks is made up of multiple point-to-point network segments (e.g., electrically conductive cabling with typical RJ-45 type connectors at each end) extending between networked devices and/or components, including between pairs of the alarm panels 1000a-f to form the alarm network 1999 and between pairs of the components of each the alarm panels 1000a-f to form their individual ones of the internal network 599.

More specifically, the internal network 599 may be implemented with multiple separate point-to-point network segments that individually couple at least each of the alarm controller 100 and the network connector 598 to a separate physical network interface port of the network controller 500. The network controller 500 implements an internal network switch that operates those separate physical network interface ports in a manner that cooperates with those separate point-to-point network segments to form the internal network 599. Similarly, it is envisioned that the alarm network 1999 is implemented with multiple separate point-to-point network segments that couple different pairs of the alarm panels 1000*a-f* together using additional separate physical network ports of corresponding ones of the network controller 500 incorporated into each of the alarm panels 1000*a-f*. The network controller 500 implements a routing bridge that operates those additional separate physical network interface ports in a manner that cooperates with those separate point-to-point network segments coupling the alarm panels 1000*a-f* to each other to form at least a portion of the alarm network 1999.

The network controller 500 may be also interposed between the external network 9999 and each of the networks 599 and 1999 to provide an alternative way in which the programmer device 7000 (if present) or the communications device 7500 (if present) may be coupled to the alarm panel 1000*a*. It is envisioned that the external network 9999 is a general purpose network used within a structure and/or among structures and is unrelated to detecting and responding to alarm conditions. The external network 9999 may be coupled via a gateway or other mechanism to still other networks such as and/or to the Internet.

As further depicted, the alarm panel 1000*a* may incorporate the external message controller 200 coupled to the alarm controller 100 to cause signaling of remotely located personnel (e.g., a police department, a fire department, a dispatching center, etc.) of an alarm condition. As will be explained in greater detail, the external message controller 200 may cooperate with the network controller 500 to automatically select one of what may be multiple connections of the alarm system 5000 to an external network through which such remote personnel are able to be signaled (e.g., the Internet or an external network provided access to the Internet).

As still further depicted, the alarm panel 1000*a* may be further coupled to a building automation network 3999 through the building automation controller 300 (if present). As previously discussed, such a coupling to the building automation network 3999 enables interaction between the alarm system 5000 and components of a building environmental system that enables actions to be taken with regard to the operation of those environmental system components in response to detecting an alarm condition. The building automation network 3999 may be based on any of a variety of signaling technologies and/or protocols, including wired and/or wireless communications. By way of example, the building automation network 3999 may be implemented in a manner adhering to the electrical and/or protocol specifications of the building automation and control network (BACnet) promulgated by BACnet International.

Each of the networks 599, 1999, 3999 and 9999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. However, it is envisioned that the network segments making up the internal network 599 are implemented with an electrically conductive wired technology compliant with one or more of the 802.3 series specifications for Ethernet promulgated by the Institute for Electrical and Electronics Engineers (IEEE). It is also envisioned that such a choice of electrically conductive wired technology is the default choice of network technology for implementing each of the network segments of the alarm network 1999. However, it is also envisioned that in instances where a specific point-to-point network segment of the alarm network 1999 may be required to extend a considerably greater distance between the network controllers 500 of two of the alarm panels 1000*a-f* than can be reliably supported by such a choice of wired technology, either a wireless network technology or a fiberoptic technology may be employed. In support of this, the network controller 500 may be configured to support being coupled to one or more additional components (not shown) that provide appropriate interfaces for the use of such other network technologies.

The processor components 150 and/or 550 may include any of a wide variety of commercially available processors. The storage devices 160 and 560 may be based on any of a wide variety of information storage technologies. It should be noted that although each of the storages 160 and 560 is depicted as a single block, one or both of these may include a combination of multiple storage devices that may be based on differing and/or identical storage technologies.

Figure 4:
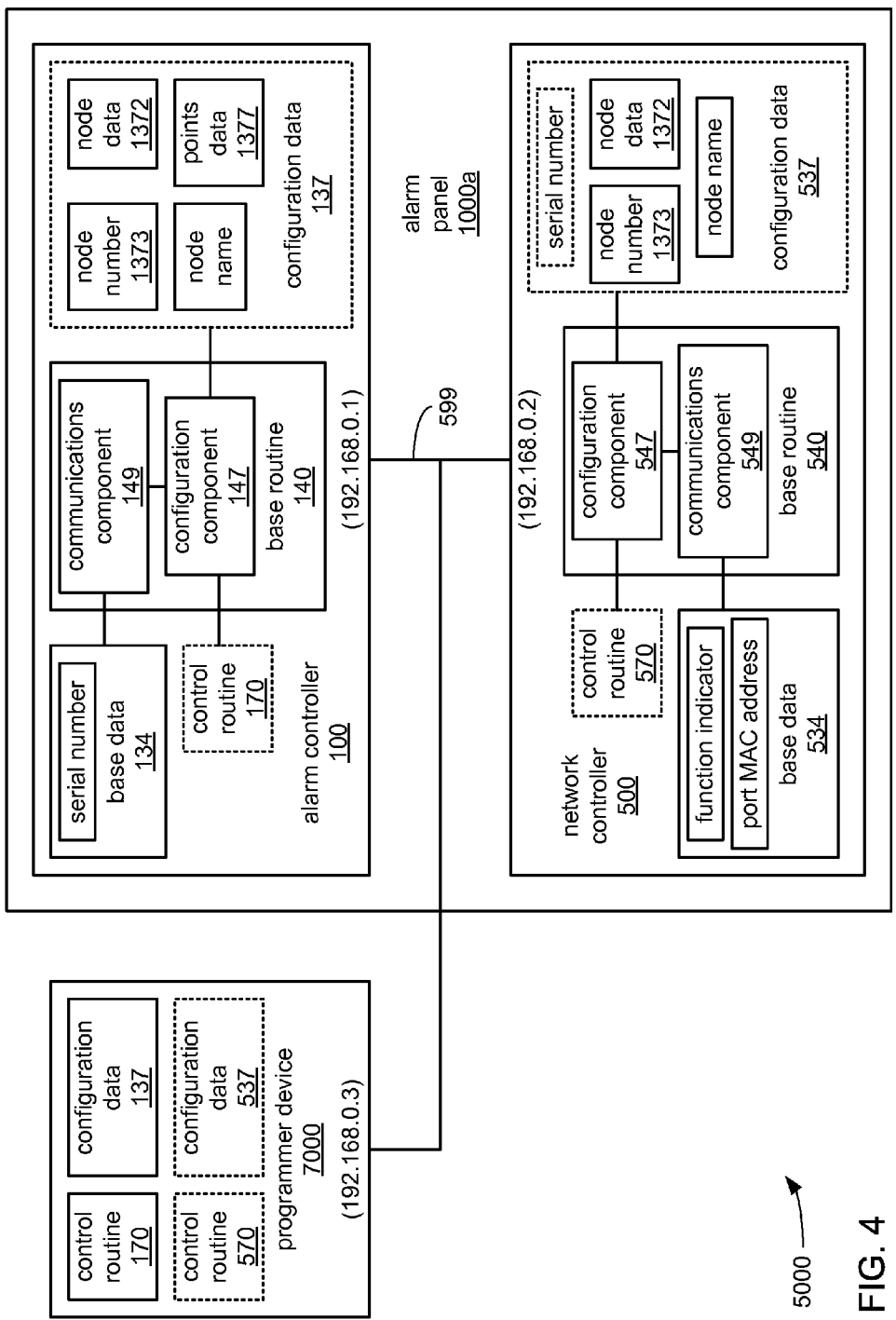

FIG. 4 is a block diagram of a portion of the embodiment of the alarm panel 1000*a* of FIG. 3 depicting a subset of the components in greater detail. Before the alarm panel 1000*a* can be used as part of the alarm system 5000, the alarm controller 100 and the network controller 500 must each be programmed during installation of the alarm panel 1000*a*. In such programming, the alarm controller 100 is prepared to monitor both local and remotely located points 115-117, and to respond to alarm conditions. The alarm controller 100 is provided with the control routine 170 and the configuration data 137. The network controller 500 is provided with the control routine 570 and the configuration data 537.

Portions the base routine 140 and the base data 134 are stored within a non-volatile portion of the storage device 160 of the alarm controller 100, and at least portions of the base routine 540 and the base data 534 may be stored within a non-volatile portion of the storage device 560 of the network controller 500. The base data 134 may include at least a serial number of the alarm controller 100, and the base data 534 may include at least a function indicator and port machine access control (MAC) address. The serial number may be provided to the alarm controller 100 during its manufacture as a unique identifier of that particular alarm controller 100. Similarly, the function indicator and the port MAC address may be provided to the network controller 500 during its manufacture, with the port MAC address being unique to that particular network controller 500. As depicted, the base routines 140 and 540 incorporate configuration components 147 and 547 as well as communications components 149 and 549, respectively.

The processor components 150 and 550 execute sequences of instructions of the base routines 140 and 540, respectively, in response to being powered up and/or reset with the control routines 170 and/or 570 not already stored in the storage devices 160 and/or 560, or otherwise in response to being signaled with a command to do so (e.g., a command received from the programmer device 7000 or via operation of the controls 120). Regardless of how execution of the base routines 140 and 540 is initiated, their execution causes the processor components 150 and 550, respectively, to perform various operations to enable communications via the internal network 599 among the alarm controller 100, the network controller 500 and the programmer device 7000. The alarm controller 100 is assigned an Internet protocol (IP) address of 192.168.0.1, the network controller 500 is assigned an IP address of 192.168.0.2, and the programmer device 7000 is assigned an IP address of 196.168.0.3. It should be noted that these are examples of possible IP addresses that may be used, and should not be interpreted as limiting the scope of this disclosure.

In some embodiments, one or the other of the processor elements 150 and 550 are caused by their execution of the communications component 149 or 549, respectively, to implement a dynamic host configuration protocol (DHCP) server to generate and assign IP addresses (e.g., the depicted example IP addresses) to the alarm controller 100, the network controller 500 and the programmer device 7000. In other embodiments, the alarm controller 100 and/or the network controller 500 may be pre-assigned their respective IP addresses, and those IP addresses may be stored in their respective base data 134 and/or 534. Regardless of how each of these IP addresses are assigned, their assignment results in each of the alarm controller 100, the network controller 500 and the programmer device 7000 having a uniquely addressable IP address on the internal network 599.

Following assignment of the IP addresses, the processor components 150 and 550, in executing the configuration components 147 and 547, receive and store the control routines 170 and 570 and the configuration data 137 and 537, respectively from the programmer device 7000. In some embodiments, the programmer device 7000 may provide the control routines 170 and 570 along with the configuration data 137 and 537, to the alarm controller 100, and the processor component 150 of the alarm controller 100 may relay the control routine 570 and the configuration data 537 to the network controller 500. In other embodiments, the programmer device 7000 may provide the control routine 170 and the configuration data 137 to the alarm controller 100, and provide the control routine 570 and the configuration data 537 to the network controller 500.

Regardless of how each of the alarm controller 100 and the network controller 500 are programmed by the programmer device 7000, once so programmed, each is able to cooperate with the other to cause the alarm panel 1000*a* to function as part of the alarm system 5000. In other words, the programmer device 7000 configures the alarm controller 100 and the network controller 500 of the alarm panel 1000*a* to communicate with the other alarm panels 1000*b-f*, as well as with the sensors 115, controls 116 and annunciators 117 (i.e., the points 115-117) associated with each of the alarm panels 1000*a-f*. The control routine 170 incorporates instructions for execution by the processor component 150 to recurringly monitor various points and to respond in any of a number of specified ways to indications of an alarm condition from various ones of those points 115-117. The control routine 570 incorporates instructions for execution by the processor component 550 to provide communications between components of the alarm panel 1000*a*, including the alarm controller 100, and the other alarm panels 1000*b-f* of the alarm system 5000 to extend the monitoring of points and the exchange of information concerning alarm conditions to the other alarm panels 1000*b-f*.

Each of the configuration data 137 and 537 includes one or more of a node data 1372, a node number 1373 and a node name. Each of the alarm panels 1000*a-f* and its associated points 115-117 is generally referred to as a node on the alarm network 1999. The node number 1373 is the node identifier assigned to the alarm panel 1000*a*, and the node name is a human-readable name assigned to the alarm panel 1000*a*. The node data 1372 includes an indication of the node numbers and node names assigned to all of the alarm panels 1000*a-f* of the alarm system 5000, an indication of which points that are remotely accessible via the alarm network 1999 are associated with which nodes, and an indication of one or more groups of nodes for use in multicast network communications via the alarm network 1999. As also depicted, the configuration data 137 additionally includes a points data 1377 that provides further details concerning the points coupled to the alarm panel 1000*a* and concerning points coupled to the other alarm panels 1000*b-f* that the alarm panel 1000*a* may interact with. The configuration data 537 additionally includes the serial number of the alarm controller 100, although this serial number may be provided to the network controller 500 in a different data structure in other possible embodiments.

The provision of multiple different pieces of identifying information associated with the alarm panel 1000*a* aids in ensuring that the alarm panel 1000*a* remains identifiable in various situations. By way of example, although the node name provides a convenient human-readable identifier, there may be an instance where two or more alarm panels in an alarm system are mistakenly given the same node name. In such a situation, the differing node numbers and/or serial numbers may be employed to distinguish among them. By way of another example, although the serial number provides an identifier that cannot be changed mistakenly by programming, it may be changed as a result of the alarm controller 100 being replaced, possibly due to a malfunction of the alarm controller 100. In such a situation, the node number and/or node name may be employed to still be able to identify that alarm panel in spite of the changed serial number.

Figure 5:
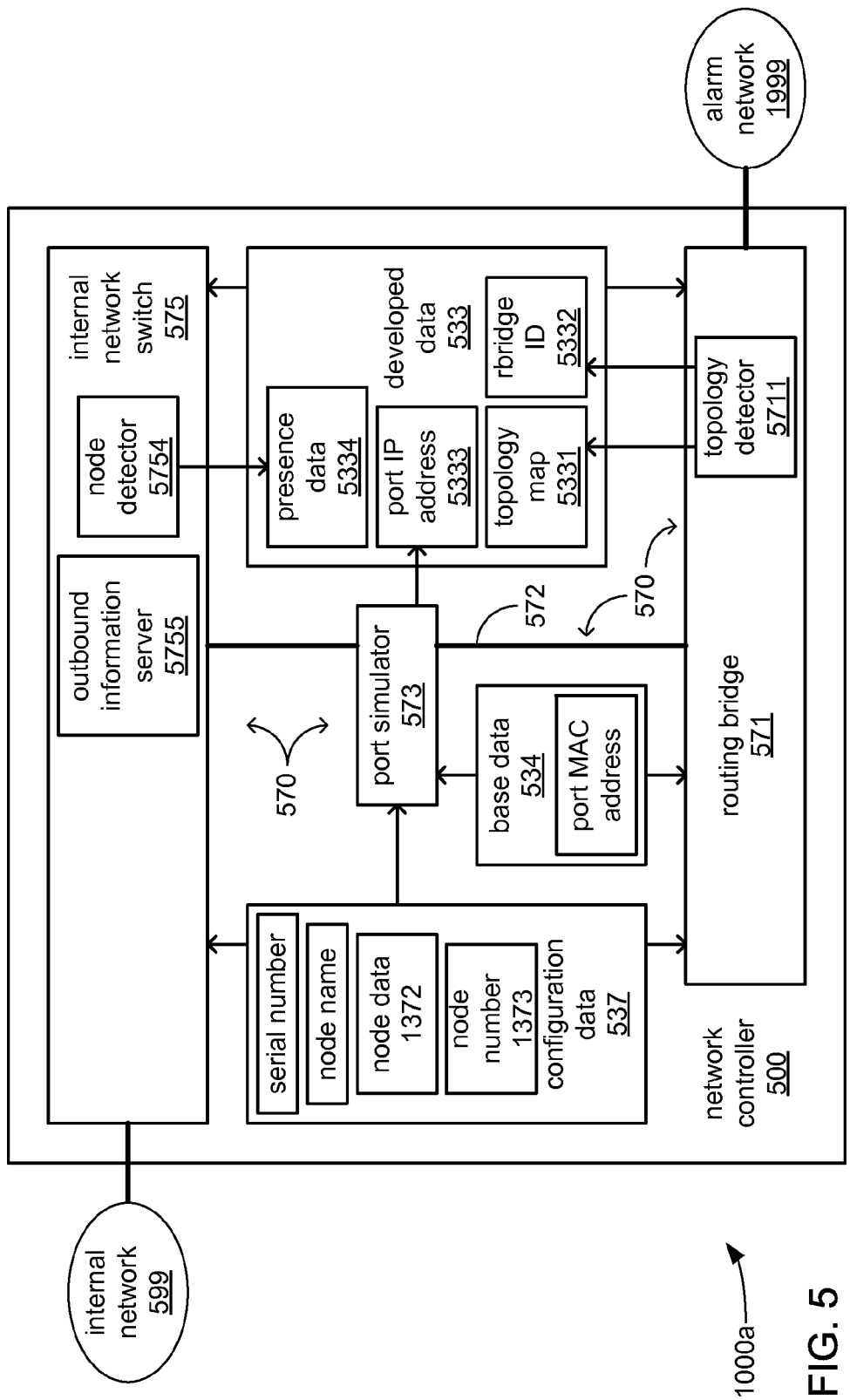
FIG. 5 illustrates a portion of the embodiment of FIG. 4.

FIG. 5 is a block diagram of a portion of the network controller 500 of the embodiment of the alarm panel 1000*a* of FIG. 4 depicting aspects of its initialization to further prepare it for normal use as part of the alarm system 5000. In such initialization, the network controllers 500 of each of the alarm panels 1000*a-f* perform a process of essentially "discovering" the topology of the alarm network 1999, the presence of the other alarm panels on the alarm network 1999, and the locations of the other alarm panels within that topology. In so doing, the network controller 500 of the alarm panel 1000*a* provides data associated with the alarm panel 1000*a* to the other alarm panels 1000*b-f* and retrieves data associated with the other alarm panels 1000*b-f* via the alarm network 1999.

As previously discussed, the control routine 570 provides communications between components of the alarm panel 1000*a* and the other alarm panels 1000*b-f*, including monitoring of remotely located points and exchanging indications of alarm conditions. In executing a sequence of instructions of the control routine 570, the processor component 550 implements an internal network switch 575 to form the internal network 599. The internal network switch 575 operates the network interface ports of the network controller 500 by which the network controller 500 is coupled through network segments to the alarm controller 100, the network connector 598, the programmer device 7000 (if present) and/or the communications device 7500 (if present) to form the internal network 599. The processor component 550 also implements a routing bridge 571. The routing bridge 571 cooperates with its counterpart network controllers 500 of the alarm panels 1000*b-f* to form at least a portion of the alarm network 1999. The routing bridge 571 is also coupled within the network controller 500 to the internal network switch 575 to exchange network traffic as part of network communications between the alarm panel 1000*a* and the other alarm panels 1000*b-f*. In a more conventionally implemented network where the routing bridge 571 would not be incorporated into the network controller 500, each of the alarm panels 1000a-f would be coupled to a physically separate routing bridge by a point-to-point network segment.

In executing a sequence of instructions of the control routine 570, the processor component 550 implements a port simulator 573. In particular, the internal network switch 575 and the routing bridge 571 are implemented such that there is a physical network connection therebetween that includes a physically-implemented network interface port through which signals are exchanged via one or more electrical and/or optical conductors. However, it is envisioned that the implementation of the internal network switch 575 and the routing bridge 571 by the same processor component 550 executing the same control routine 570 results in a virtual network connection between the internal network switch 575 and the routing bridge 571. Thus, the existence of a network interface port of the internal network switch 575 that is provided with a port MAC address and an IP address (just like a physically-implemented network interface port) is simulated by the port simulator 573, along with a simulated single-segment point-to-point virtual network 572 to couple this simulated port to the routing bridge 571.

As those skilled in the art will recognize, network bridges selectively convey network traffic between networks based on indications of intended destinations, and that traffic is conveyed in packets that encapsulate frames of that traffic and that are exchanged between bridge devices. Compared to simpler bridge devices, routing bridges use information concerning the topology of a network to attempt to identify the most efficient pathways to convey packets to their intended destinations. Evaluating the efficiency of different choices of pathways may include evaluations of one or both of relative numbers of point-to-point segments to traverse and relative data transmission rates of each segment. Routing bridges may also employ load balancing in which multiple packets are directed to the same destination via more than one pathway so as to avoid overloading the point-to-point segments of any one of those pathways. Such information concerning the topology may be acquired via various protocols to exchange connection information and/or may be learned over time by observing characteristics of network traffic. Thus, upon receiving a frame of network traffic from the internal network switch 575 (via the virtual network interface port provided by the port simulator 573 and the virtual network 572), the routing bridge 571 of the alarm panel 1000a encapsulates that frame in a packet to which it adds an indication of the identity of the routing bridge 571 of the one of the other alarm panels 1000b-f that is the intended destination (the intended destination more specifically being the virtual network port simulated by the port simulator 573 of that destination alarm panel). That packet is then routed towards the routing bridge 571 of that destination alarm panel by one or more of the routing bridges 571 in the alarm system 5000 using data gathered about the topology of the connections among these routing bridges 571. Upon reaching the one of the routing bridges 571 at the destination alarm panel, that one of the routing bridges 571 undoes the encapsulation and provides the frame to its local one of the internal switches 575 through its local simulation of a virtual network 572 and virtual network interface port provided by its local one of the port simulators 573.

Thus, for the routing bridges 571 to perform as just described, each must be provided with data concerning the topology of the connections among them that make up the alarm network 1999, as well as data concerning what virtual network interface ports representing end-points are local to each. This entails each of these routing bridges 571 being configured to provide data concerning its connections to the others. In preparing to enable the routing bridge 571 of the network card 550 of the fire panel 1000a to provide such data, the port simulator 573 retrieves at least the port MAC address of the base data 534 and the node number 1373 of the configuration data 537. In some embodiments, the port simulator 573 generates the IP address to be assigned to the simulated network interface port from the node number 1373 by any of a variety of possible algorithms, and stores an indication of what that IP address is as a port IP address 5333 in the developed data 533. In other embodiments, the configuration data 537 may include a more direct indication of what the IP address is for the simulated port.

The topology detector 5711 of the routing bridge 571 interrogates others of the routing bridges 571 through its connections on the alarm network 1999 to obtain enough information concerning the connections of those others of the routing bridges 571 to derive a map of the topology of the alarm network 1999. As previously discussed, the routing bridge 571 uses information concerning the topology of the alarm network 1999 to determine the most efficient pathway for routing packets towards their destinations. With the virtual port simulated by the port simulator 573 now provided with its own MAC address and its own IP address, the topology detector 5711 of the routing bridge 571 now has the information needed to answer such interrogation by the topology detectors 5711 of the other routing bridges 571. In particular, the topology detector 5711 transmits data concerning the connections of its own routing bridge 571 (including its connection to the virtual network port simulated by the port simulator 573) to the topology detectors 5711 of those other routing bridges 571 and receives data concerning their connections. As part of these communications among the routing bridges 571 of the alarm network 1999, each of the routing bridges 571 is assigned a unique routing bridge identifier to be used in routing messages conveying packets among them. In other words, each routing bridge 571 is given a unique routing bridge identifier that allows the alarm panels 1000a-f to communicate. The topology detector 5711 stores data it receives concerning the connections of other routing bridges 571 as a topology map 5331 of the developed data 533, and stores the routing bridge identifier assigned to the routing bridge 571 of the alarm panel 1000a as the rbridge ID 5332 of the developed data 533.

With the routing bridge 571 now provided with data concerning the topology of the alarm network 1999 and its own identifier, the routing bridge 571 is able to begin exchanging packets with one or more of its counterpart routing bridges 571 such that network communications via the alarm network 1999 are now possible. In response to this, an outbound information server 5755 of the internal network switch 575 now retrieves the serial number, the node name and the node number of the configuration data 537, retrieves the port IP address 5333, retrieves the port MAC address of the base data 534, and prepares to transmit such information in response to any requests received from the other alarm panels 1000b-f for such information. Also, a node detector 5754 of the internal network switch 575 commences making one or more of such requests of whichever ones of the other alarm panels 1000b-f are currently able to be contacted via the alarm network 1999. In response to such requests made by the node detector 5754, the outbound information server 5755 of one or more of the other alarm panels 1000b-f responds by providing the serial number, node name, node number 1373, port IP address 5333 and/or port MAC address associated with each of them. The node detector 5754 stores such information that it receives from the other alarm panels 1000b-f as a presence data 5334 of the developed data 533. As a result of the exchanges of topology-related information conducted by the topology detector 5711 and the queries for details of the other alarm panels 1000b-f made by the node detector 5754, a rather complete picture of the alarm network 1999 and the alarm panels 1000a-f connected thereto is derived and stored in the developed data 533 for use by the network controller 500.

Although the implementation of the routing bridge 571 may be based on the use of any of a number of sets of algorithms for routing packets, it is envisioned that the routing bridge 571 is implemented with algorithms selected to adhere to the Transparent Interconnection of Lots of Links (TRILL) specification promulgated by the Internet Engineering Task Force (IETF). The use of TRILL-compliant routing algorithms and/or other routing algorithms associated with routing bridges removes numerous forms of complexity from the work of installing the alarm network 1999. The need to define and configure multiple IP address subnets in a "tree-like" hierarchical address topology is entirely eliminated since routing bridges do not make use of IP addresses in their exchanges of packets with each other. This also enables the use of broadcasting and multicasting across the alarm network 1999 easier, since its lack of use of IP addresses between the routing bridges 571 eliminates the difficulties of propagating broadcast and multicast transmissions through address translations between IP address subnets.

With each of the routing bridges 571 envisioned as implemented to be TRILL-compliant, it is envisioned that the topology detector 5711 of each of these routing bridges employs a variant of the intermediate-system-to-intermediate-system (IS-IS) protocol associated with TRILL to exchange information concerning the connections of each of the routing bridges 571. Alternatively, other implementations of a link state routing protocol may be employed. In some embodiments, the node detector 5754 may be implemented to transmit address resolution protocol (ARP) and/or domain name server (DNS) requests across the alarm network 1999 to elicit responses from the outbound information servers 5755 of the network controllers 500 of the other alarm panels 1000b-f acting as ARP and/or multicast-DNS (MDNS) servers. Alternatively or additionally, the outbound information servers 5755 may respond to request for information employing one or more other protocols to provide one or more pieces of information regarding their respective nodes and/or the virtual network interfaces that each simulates via corresponding ones of the port simulator 573.

It should be noted that the functionality of the node detector 5754 and the topology detector 5711 may be combined in a single detector employing a protocol (or combination of protocols) to retrieve both information concerning the topology of the alarm network 1999 and information (including node numbers and node names, as well as IP addresses and MAC addresses) of the virtual network interfaces simulated by the port simulator 573 within each of the network controllers 500 present on the alarm network 1999. The fact of the routing bridges 571 of the alarm network 1999 being integrated into each of the network controllers 500 of each of the alarm panels 1000a-f enables a degree of pooling and sharing of information not found in other network controllers. Specifically, protocols employed by routing bridges and endpoint devices (which is what the internal network switch 575 appears to be to the routing bridge 571 as a result of the simulation of a network interface port by the port simulator 573) tend to retrieve different kinds of information such that routing bridges and endpoint devices do not typically receive all of the same kinds of information in response to their queries. Still further, the routing bridge 571 may learn addition information from observing various identifying aspects (e.g., MAC addresses, IP addresses, rbridge IDs, etc.) of packets it receives in response to queries made by the node detector 5754. With the information gleaned from the queries made by components of the routing bridges 571 and the queries made by components of the internal switches 575 (in their role as an endpoint device of the alarm network 1999) able to be stored as part of the same developed data 533, the opportunity is provided to fill gaps in the information received by each with information received by the other. The increased accuracy of the view provided into the details of the alarm network 1999 enabled by such a combining of information may enable better responses to instances of failures of network segments or devices making up the alarm network 1999.

It should be noted that it is envisioned that the topology detector 5711 and/or the node detector 5754 are to be used recurringly to recurringly check for changes in the alarm network 1999 and/or what ones of the alarm panels 1000b-f are present thereon. Thus, it is envisioned that one or both of the topology map 5331 and the presence data 5334 are recurringly updated to reflect recently discovered changes.

Figure 6:
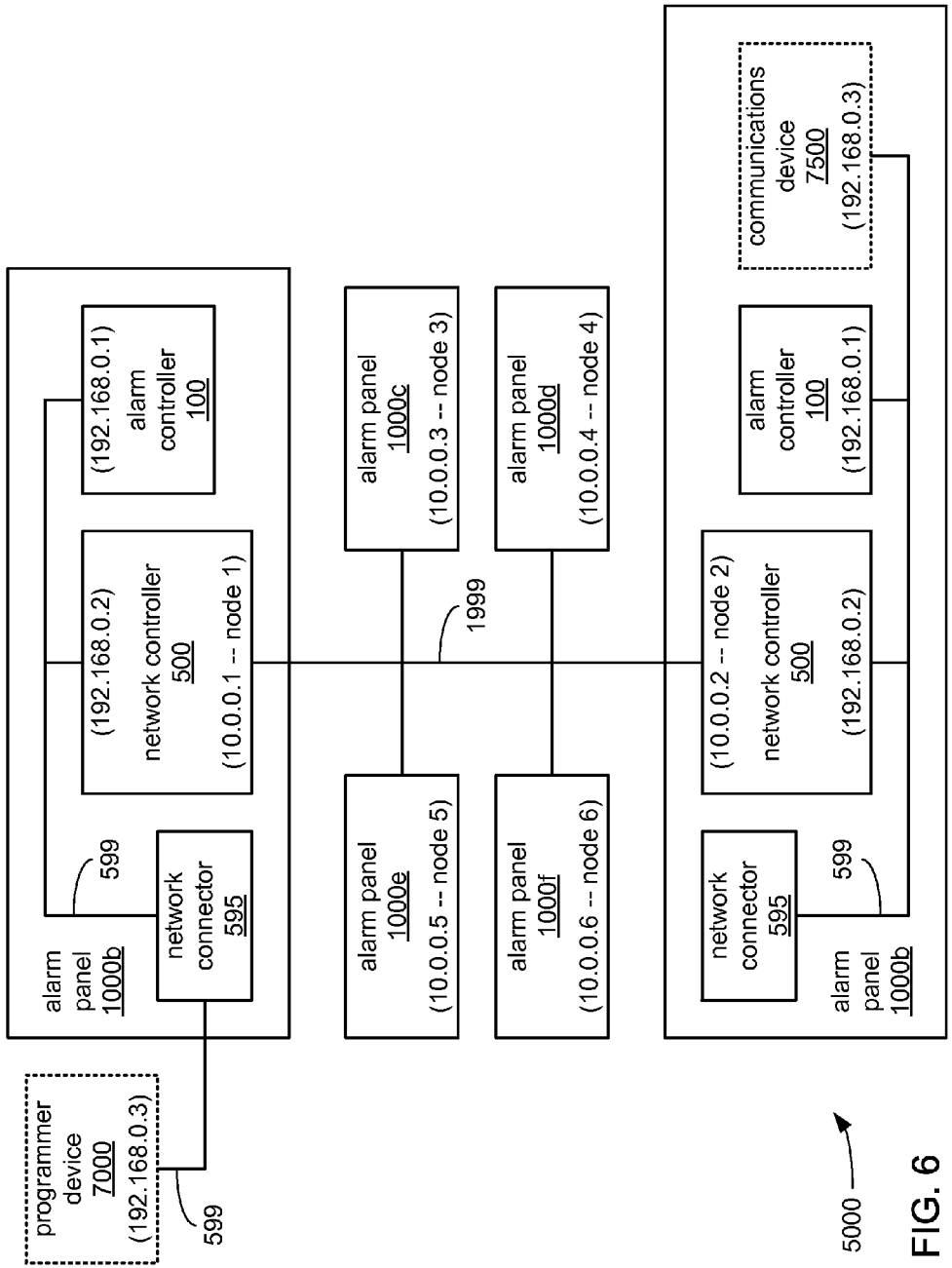
FIG. 6 illustrates an embodiment of an alarm network.

FIG. 6 is a simplified block diagram of the embodiment of the alarm system 5000 of FIG. 1 depicting aspects of the results of the network controllers 500 of each of the alarm panels 1000a-f performing various ones of the functions described with regard to FIG. 5. More specifically, FIG. 6 illustrates the assignments of IP addresses and node numbers for each of the alarm panels 1000a-f and within exemplary alarm panels 1000a and 1000b. These assignments of IP addresses, along with the assignments and exchanges of other identifying data, are performed by the network controllers 500 of the alarm panels 1000a-f to enable each of the alarm panels 1000a-f and various components within each of the alarm panels 1000a-f to be contacted for communication. For brevity, the assignment of IP addresses and node numbers for each of the alarm panels 1000c-f is not depicted or discussed, but the process depicted and described with reference to the alarm panels 1000a and 1000b may be applied thereto. The IP addresses depicted for the components of each of the alarm panels 1000a and 1000b on their respective ones of the internal network 599 are selected to correspond with the IP addresses earlier depicted in FIG. 4. However, it is important to note that such a depiction of specific IP addresses should be taken as only an example, and not as an indication of a limitation requiring use of specific IP addresses and/or of specific subnet ranges of IP addresses.

Also illustrated is the possibility that different ones of the alarm panels 1000a-f may incorporate different selections of components and/or may be coupled to different other devices at different times. Specifically, the alarm panel 1000a is depicted as possibly having the programmer device 7000 coupled to it via its network connector 598, while the alarm panel 1000b is depicted as possibly having the communications device 7500 incorporated into it and coupled more directly to its internal network 599.

Each alarm controller 100 and each network controller 500 is manufactured to function largely identically prior to being programmed for use in a particular alarm network of a particular structure (or campus of structures). Thus, in the internal network 599 of each of the alarm panels 1000a-f, the alarm controller 100 and the network controller 500 may normally always be assigned the same IP addresses, unless possibly changed in one or more of the alarm panels 1000a-f by programming Hence, the depiction of the alarm controllers 100 of both the alarm panels 1000a and 1000b having the same IP address of 192.168.0.1, as well as the depiction of the network controllers 500 of both of these same panels having the same IP address of 192.168.0.2. However, it is important to note that entirely different IP address ranges may be employed on the internal networks 599 of each of the alarm panels 1000a-f.

As described below, the internal network switch 575 of each network controller 500 includes a network address translator that isolates the IP addressing of the internal network 599 within each of the alarm panels 1000a-f from the IP addressing that is employed at the endpoints of the alarm network 1999. Thus, there need be no relationship between the IP addressing of the internal network 599 (e.g., the depicted example IP addresses of 192.168.0.1 to 192.168.0.3) and the IP addressing at the endpoints of the alarm network 1999 (e.g., the depicted example IP addresses of 10.0.0.1 to 10.0.0.6).

Figure 7:
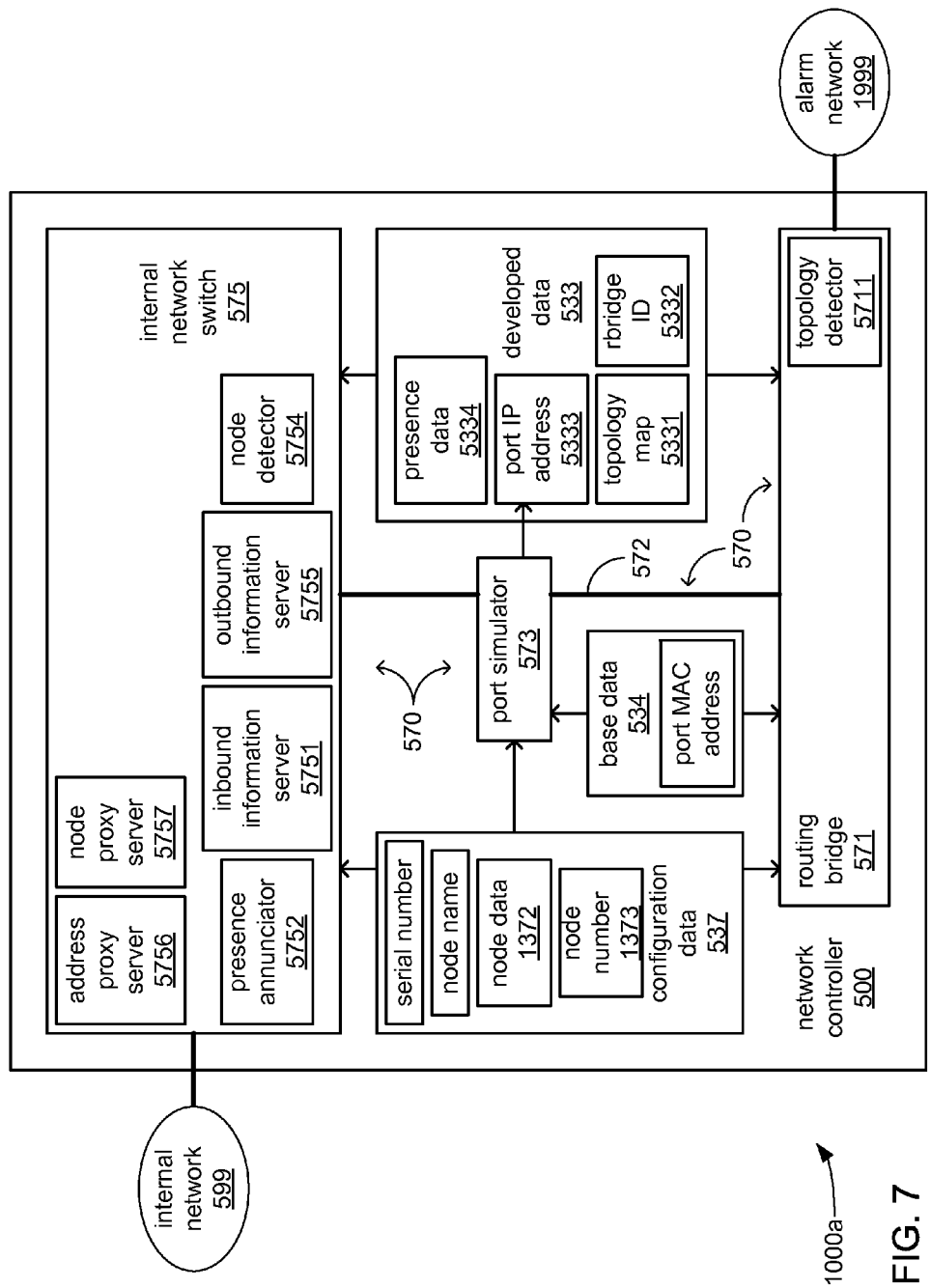
FIGS. 7-13 each illustrate a portion of the embodiment of FIG. 4.

FIG. 7 is a block diagram of a portion of the network controller 500 of the embodiment of the alarm panel 1000a of FIG. 4 similar to FIG. 5, and depicting further aspects of its initialization to further prepare it for normal use as part of the alarm system 5000. In such initialization, the network controller 500 enables the provision of data concerning the alarm panels 1000b-f to components coupled to the internal network 599 of the alarm panel 1000a, following receipt of such data.

Following retrieval of data concerning the alarm network 1999 and the other alarm panels 1000b-f coupled thereto, an address proxy server 5756 of the internal network switch 575 retrieves the presence data 5334. For each of the alarm panels 1000b-f indicated in the presence data 5334 as having been found on the alarm network 5999, the address proxy server 5756 provides an address proxy at a unique IP address on the internal network 599. In this way, the address proxy server 5756 creates a local presence for each of the alarm panels 1000b-f on the internal network 599 that may be selected to communicate with by selecting its IP address on the internal network 599. It should be noted that it is envisioned that the retrieval of the presence data 5334 by the address proxy server 5756 is to be done on a recurring basis such that the presence or absence of address proxies provided by the address proxy server 5756 is recurringly updated to reflect changes in which ones of the alarm devices 1000b-f are found be present on the alarm network 1999. However, in some embodiments, there may be a delay in the removal of an address proxy provided by the address proxy server 5756 from the internal network 599 (e.g., several seconds, a minute, several minutes, half an hour, an hour, etc.) to accommodate what may be only a relatively brief loss of communications with the alarm panel that proxy is associated with.

An inbound information server 5751 of the internal network switch 575 retrieves at least the presence data 5334 of the developed data 533, including node numbers, node names and serial numbers associated with each of the alarm panels 1000b-f for which information is available in the presence data 5334. As explained in more detail below, the developed data 533 provides a picture of the alarm network 1999 and the alarm panels 1000a-f. The inbound information server 5751 also retrieves from the address proxy server 5756 indications of what IP addresses on the internal network 599 have been assigned to each of the address proxies presented on the internal network 599 by the address proxy server 5756. The inbound information server 5751 then prepares to transmit information made up of the IP addresses of the address proxies currently presented by the address proxy server 5756 and one or more of the node number, node name and serial number associated with whichever ones of the alarm panels 1000b-f are associated with the address proxies that are so presented. The inbound information server 5751 transmits this information in response to requests received from any component of the fire panel 1000a or any other device coupled to the internal network 599 of the alarm panel 1000a (e.g., via the network connector 598). Thus, in essence, the information server 5751 actually transmits information concerning the address proxies that are presented by the address proxy server 5756 on the internal network, along with information concerning the alarm panels represented by those address proxies. It should be noted that it is envisioned that the retrieval of the presence data 5334 by the inbound information server 5751 is to be done on a recurring basis such that the information it transmits is recurringly updated to reflect changes that are found to have occurred in the alarm network 1999 and/or the alarm panels 1000b-f that may be found to be attached thereto at any given time.

Also, a presence annunciator 5752 of the internal network switch 575 retrieves similar information of the presence data 5334 and retrieves the node data 1372 of the configuration data 537. The presence annunciator 5752 compares the data retrieved from the presence data 5334 to the data retrieved from the node data 1372, and prepares to transmit indications of discrepancies found between them to the alarm controller 100. As previously discussed, the node data 1372 provides such information as node names, node numbers and/or serial numbers associated with each of the alarm panels 1000a-f of the alarm network 5000. Thus, the node data 1372 indicates what alarm panels should be present on the alarm network 5000 and various details concerning them. In contrast, and as previously discussed, the presence data 5334 provides an indication of what alarm panels have been found to be present on the alarm network 1999 and various details concerning them as provided by them. Thus, the comparison performed by the presence annunciator 5752 reveals instances of where what is found in the way of alarm panels on the alarm network 1999 differs from what is expected to be found in the way of alarm panels on the alarm network 1999. Stated differently, this comparison reveals details of which of the alarm panels 1000b-f that are expected to be found on the alarm network 1999 have actually been found on the alarm network 1999 such that they are "in attendance" such that they can be communicated with. It should be noted that, like the inbound information server 5751, it is envisioned that retrievals of the presence data 5334 by the presence annunciator 5752 are to occur on a recurring basis to ensure that indications of which ones of the alarm panels 1000b-f are "in attendance" is recurringly updated.

A node proxy server 5757 of the internal network switch 575 retrieves the node data 1372. For each of the alarm panels 1000b-f indicated to be part of the alarm system 5000 in the node data 1372, the node proxy server 5757 provides a node proxy, and all of the node proxies are provided at the IP address assigned to the network controller 500. In this way, the alarm controller 100 need only access the IP address of the network controller 500 and specify a node number, node name and/or serial number to select one of the alarm panels 1000b-f to engage in communications with. Given that the node data 1372 indicates what alarm panels are intended to be part of the alarm system 5000 (and therefore, on the alarm network 1999), instead of what alarm panels have actually been found to be present on the alarm network 1999, the set of node proxies provided by the node proxy server 5757 does not change unless there is a change in programming that updates the configuration data 537. In some embodiments, indications of which ones of the alarm panels 1000b-f are actually "in attendance" at any given time may be provided through these node proxies by the presence annunciator 5752, such that each of these node proxies may incorporate a form of "attendance" indicator.

It should be noted that in the tracking of which ones of the alarm panels 1000b-f are found to be present or "in attendance" on the alarm network 1999 at any given time, more than one of the node number, node name, serial number or IP address associated with each of the alarm panels 1000b-f may be used in combination to aid in distinguishing each of the alarm panels 1000b-f from the others. Again, such ambiguity may arise from instances of a mistake having been made in programming (e.g., more than one of the alarm panels 1000b-f given the same node name) or from instances of a component having been replaced (e.g., the alarm controller 100, which carries the serial number in at least some embodiments).

It should also be noted that the lack of presence or "attendance" of one of the alarm panels 1000b-f may be opportunistically detected as a result of a failure in an effort to transmit one or more packets to it via the alarm network 1999. In various possible embodiments, depending on the protocols of the alarm network 1999, it may be that an "acknowledge" (ACK) signal is to be transmitted upon successful receipt of a packet. Where such a protocol is employed, the lack of receipt of an ACK may be taken to signify that the alarm panel from which the ACK signal is expected is no longer present on the alarm network 1999, and this may be used to update the presence data 5334.

Figure 8:
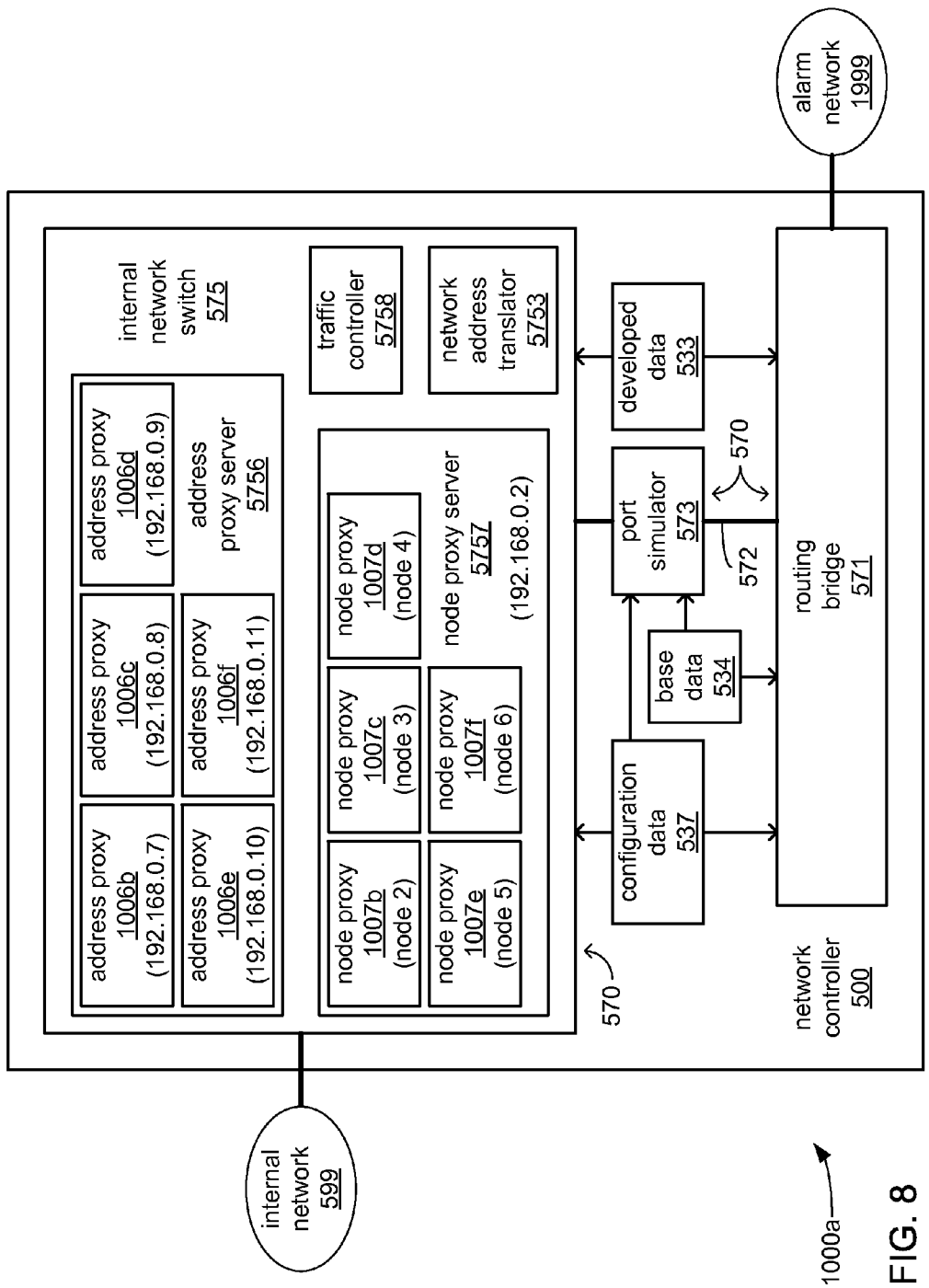

FIG. 8 is a block diagram of a portion of the network controller 500 of the embodiment of the alarm panel 1000a of FIG. 4 similar to FIGS. 5 and 7, and depicting further aspects of the node and address proxies provided on the internal network 599 for the alarm panels 1000b-f along with depictions of the IP addresses and other mechanisms by which each may be accessed. More specifically, examples of assignments of IP addresses and node numbers for each of the proxies for each of the alarm panels 1000b-f are depicted. For sake of clarity, the IP address depicted and discussed for the network controller 500 on the internal network 599 is selected to correspond with the IP address earlier depicted for the network controller 500 in FIGS. 4 and 6.

As depicted, the address proxy server 5756 provides address proxies 1006b-f for the alarm panels 1000b-f, respectively. Further, as depicted as examples, the IP addresses assigned to the address proxies 1006b-f are 192.168.0.7 to 192.168.0.11, respectively. Thus, for each of the alarm panels 1000b-f found to be present on the alarm network 1999 at any given time, an address-selectable local presence by an address proxy is provided on the internal network 599. A component of the alarm panel 1000a coupled to the internal network 599 or another device coupled to the internal network 599 (e.g., via the network connector 598) may select any one of alarm panels 1000b-f to communicate with by selecting a corresponding one of the address proxies 1006b-f, respectively, by selecting its corresponding IP address. It should be noted that although the IP addresses of the address proxies 1006b-f are depicted as being in consecutive order, it is envisioned that the assignment of IP addresses to these proxies could become more random in nature over time, as one or more of the address proxies 1006b-f are caused to cease to be provided and then provided again by the address proxy server 5756 in response to occasional changes in the presence of each of the alarm panels 1000b-f on the alarm network 1999 due to maintenance work, installation changes and/or other circumstances. As has been discussed, the alarm controller 100 may implement a DHCP server to dynamically assign IP addresses (or the network controller 500 may do so), and instances of one of the address proxies 1006b-f ceasing to be provided and then being provided again could result in a change in the IP address assigned to that one of the address proxies 1006b-f.

As also depicted, the node proxy server 5757 provides node proxies 1007b-f for the alarm panels 1000b-f, respectively. Further, all of the node proxies 1007b-f are made accessible at the same IP address of 192.168.0.2 assigned to the network controller 500 on the internal network 599. Thus, for all of the alarm panels 1000b-f, local presences by the node proxies are provided at a common IP address whether any of them are currently found to be in attendance on the alarm network 1999 or not at any given time. As has been discussed, the different ones of these node proxies are accessed using a protocol in which a node number, node name and/or serial number of an alarm controller 100 may be used to select a particular node proxy. This precludes the need for the alarm controller 100 of the alarm panel 1000a to be provided with a set of IP addresses to access proxies for each of the alarm panels 1000b-f, thereby alleviating some of the complexity in the control routine 170 that would otherwise be necessary to communicate with the alarm panels 1000b-f.

As has been previously discussed, it may be that the alarm controller 100 implements a DHCP server by which the network controller 500 is assigned its IP address on the internal network 599. The alarm controller 100 would already have access to an indication of what IP address is assigned to the network controller 500, thereby easily enabling the alarm controller 100 to access any of the node proxies 1007b-f at that IP address.

In various embodiments, the internal network switch 575 additionally implements a traffic controller 5758 to at least prioritize network traffic generated through use of the one of the address proxies 1006b-f versus one of the node proxies 1007b-f. As will be explained in greater detail, the alarm controller 100 accesses points of one or more of the other alarm panels 1000b-f through one or more of the node proxies 1007b-f to monitor their status to detect an alarm condition and/or to trigger their operation to announce an alarm condition. Other devices access one or more of the address proxies 1006b-f, such as the programmer device 7000 to remotely program one or more of the other alarm panels 1000b-f, or the communications device 7500 to convey audio and/or video among two or more of the alarm panels 1000a-f. It is envisioned that accesses by the alarm controller 100 to various points that are directly coupled to one of the other alarm panels 1000b-f constitute network traffic of higher importance than at least some other types of network traffic arising from other activity unrelated to accessing points. Thus, in some embodiments, the traffic controller 5758 may prioritize network traffic arising from accesses to the node proxies 1007b-f over network traffic arising from accesses to the address proxies 1006b-f such that network traffic associated with the address proxies 1006b-f is delayed and/or stopped in favor of allowing network traffic associated with the node proxies 1007b-f to be conveyed. Alternatively, in other embodiments, network traffic associated with the node proxies 1007b-f may be conveyed with a guaranteed minimum network bandwidth (and/or another quality of service parameter) such that network traffic associated with the address proxies 1006b-f is conveyed using whatever network bandwidth is left over. In this way, the primary function of the alarm system 5000 of detecting and responding to alarm conditions is not hindered by other network activity.

As has been previously discussed, the internal network switch 575 also implements a network address translator 5753 to separate the IP address space used on the internal network 599 from the IP address space used for the simulated network interface ports provided by the port simulator 573 implemented by each of the network controllers 500 in the alarm system 5000. Stated differently, the range of IP addresses used on the internal networks 599 are all selected to be different (including using a different subnet) from the range of IP addresses used on the alarm network 1999. This also allows a common default IP address space to be programmed into all of the alarm panels 1000*a-f* for use on the internal network 599 of each, thereby further simplifying programming by not requiring that the components each be given a different IP address space.

Figure 9:
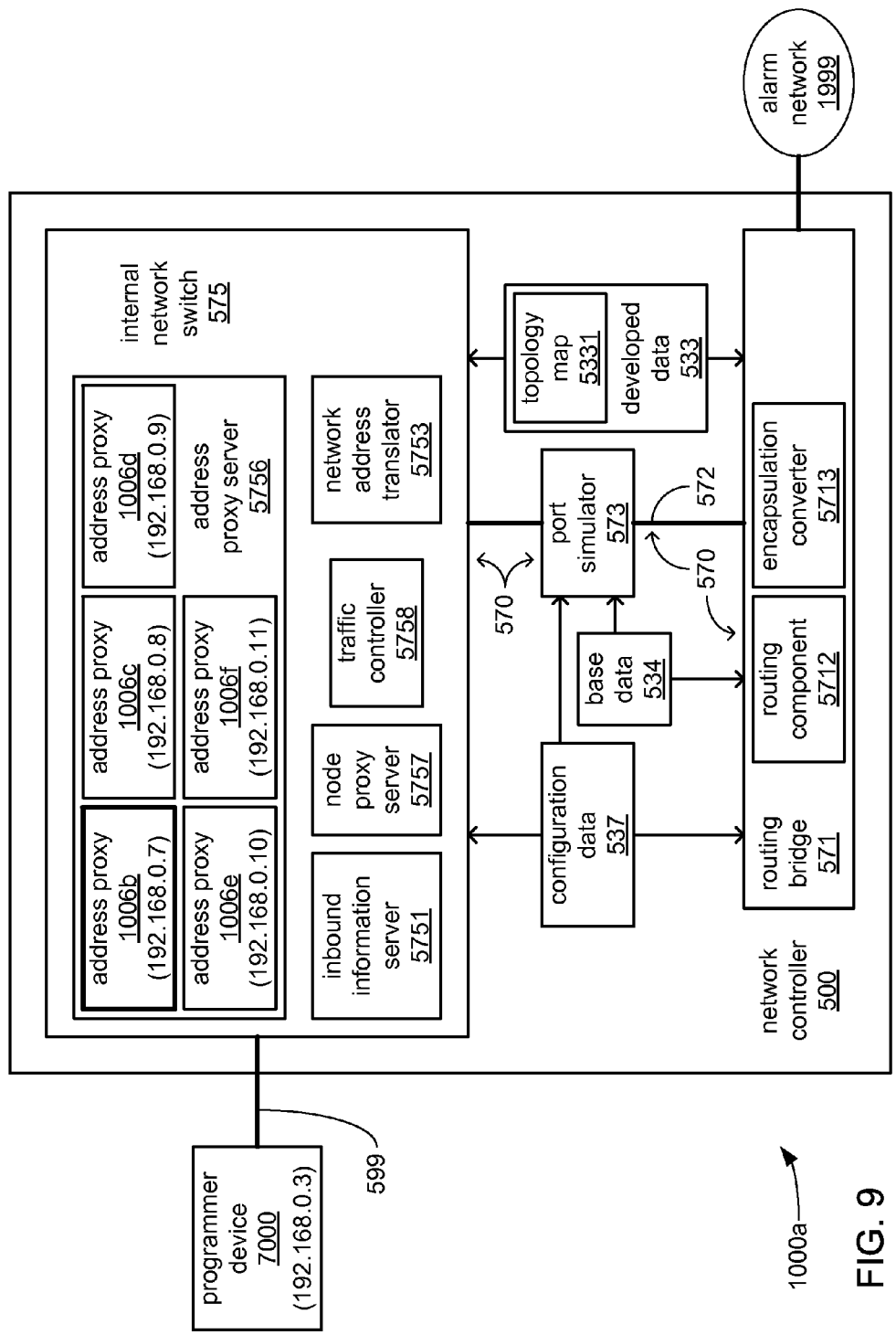
Figure 10:
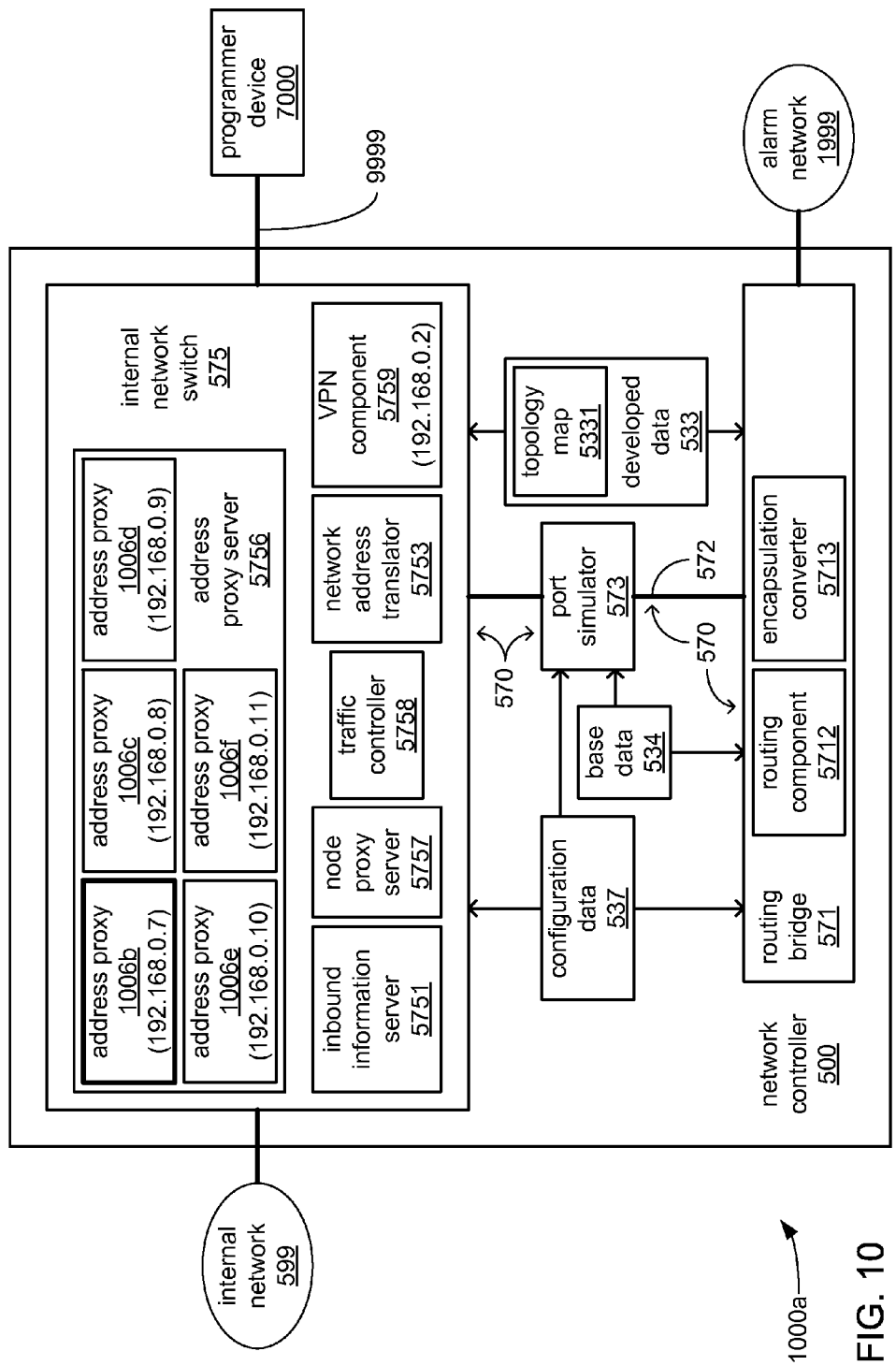
Figure 11:
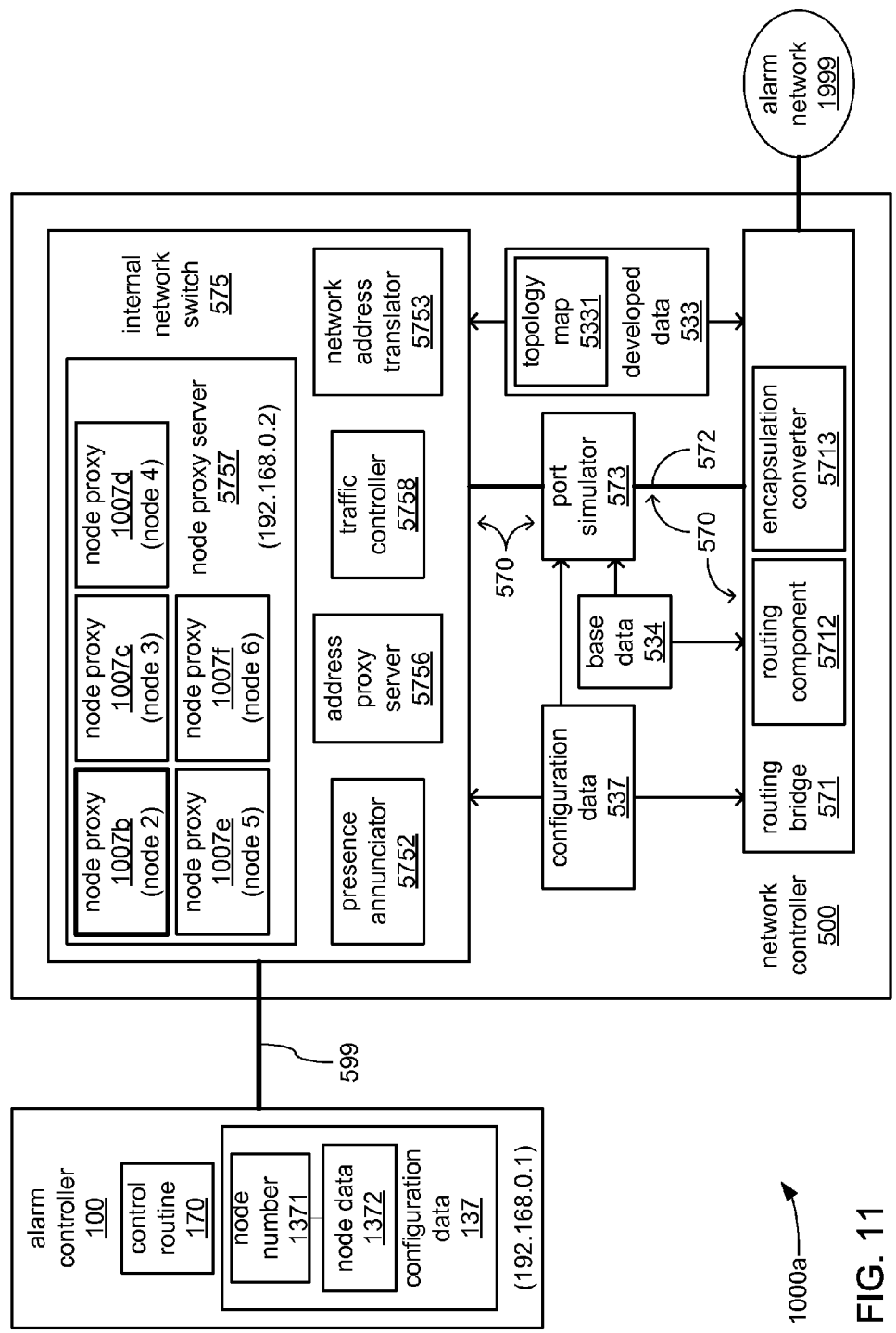

FIGS. 9, 10 and 11 are each a block diagram of a portion of the network controller 500 of the embodiment of the alarm panel 1000*a* of FIG. 4 similar to FIGS. 5 and 7-8, and depicting aspects of the use of the proxies provided on the internal network 599. More specifically, FIG. 9 depicts aspects of an example use of an address proxy by the programming device 7000 coupled to the internal network 599 to remotely program another alarm panel. FIG. 10 depicts aspects of another example use of an address proxy by the programming device 7000, but with the programming device 7000 coupled to the external network 9999. FIG. 11 depicts aspects of an example use of a node proxy by the alarm controller 100.

Turning to FIG. 9, the programmer device 7000 is coupled to the internal network 599 of the alarm panel 1000*a*, and is operated to remotely program the alarm panel 1000*b* through the address proxy 1006*b*. Packets transmitted by the programmer device 7000 to the address proxy 1006*b* at the IP address 192.168.0.7 are first converted from indicating the IP address of the address proxy 1006*b* on the internal network 599 as their destination to indicating the IP address associated with the alarm panel 1000*b* on the alarm network 1999 as their destination. Then, the packets are prioritized by the traffic controller 5758, which may slow, delay or stop the conveyance of those packets onto the alarm network 1999 if there is competing network traffic associated with one of the node proxies 1007*b-f*. The packets are then subjected to address translation by the network address translator 5753 to convert them to the address space of the IP address assigned to the virtual network interface port simulated by the port simulator 573.

Upon being conveyed as frames through the simulated port to the routing bridge 571, an encapsulation converter 5713 encapsulates those frames within packets. The encapsulation converter 5713 also retrieves the topology map 5331 to determine the rbridge ID 5332 of the routing bridge 571 of the alarm panel 1000*b* based on the IP address assigned to the virtual network interface port simulated by the port simulator 573 of the network controller 500 of the alarm panel 1000*b*, and adds an indication of that rbridge ID 5332 of the alarm panel 1000*b* to each of those packets. A routing component 5712 of the routing bridge 571 of the alarm panel 1000*a* then uses the indication of the rbridge ID 5332 associated with the routing bridge 571 of the alarm panel 1000*b* to route those packets towards it. Upon being received at the routing bridge 571 of the alarm panel 1000*b*, its corresponding encapsulation converter 5713 undoes the encapsulation making up each of those packets, and convey their contents as frames to the internal network switch 575 of the alarm panel 1000*b* through its virtual network interface port based on the IP address indicated in those frames matching the IP address of that virtual port.

As previously discussed in detail, it is necessary to first program the alarm controller 100 and the network controller 500 of one of the alarm panels 1000*a-f* with its corresponding ones of the control routine 170, configuration data 137, control routine 570 and configuration data 537 before its ability to communicate with others of the alarm panels 1000*a-f* is enabled. Therefore, it should be noted that communication between two of the alarm panels 1000*a-f* to remotely program one of them with the programmer device 7000 coupled to the other is not possible unless both have been previously programmed such that they are both able to communicate via the alarm network 1999. Thus, although it is not possible to remotely program one of the alarm panels 1000*a-f* for the very first time when it does not already have versions of the control 170, configuration data 137, control routine 570 and configuration data 537 stored therein, it is possible to remotely program one of the alarm panels 1000*a-f* to update its version of one or more of these.

Further, beyond such previous programming of a remotely located alarm panel enabling it to be remotely programmed to update it, its earlier programming imparts the ability to provide one or more of a node number, a node name or a serial number by which the identity of the remotely located alarm panel may be verified before it is remotely programmed. As has been previously discussed, use of more than one of these identifying pieces of information may aid in overcoming instances of ambiguity concerning the identity of a remotely located alarm panel where two or more have the same node name and/or where a remotely located alarm panel shows a change in the serial number arising from replacement of its alarm controller 100.

The manner in which the communications device 7500 would interact with the network controller 500 would be quite similar. However, the packets it would send to one of the address proxies 1006*b-f* would convey audio (e.g., voice detected by a microphone thereof) and/or images (e.g., video detected by a camera thereof) towards another of the alarm panels 1000*b-f*.

FIG. 10 depicts an alternate example of the programmer device 7000 coupled to the alarm panel 1000*a* and used to remotely program the alarm panel 1000*b*. The example of FIG. 10 differs principally from the example of FIG. 9 in that the programmer device 7000 is coupled to the network controller 500 of the alarm panel 1000*a* via the external network 9999, instead of via the internal network 599. To enable the programmer device 7000 to be coupled to the network controller 500 and communicated with in a secure manner via the external network 9999, a virtual private network (VPN) component 5759 of the internal network switch 575 forms a VPN tunnel through the external network 9999 between the network controller 500 and the programmer device 7000. The VPN component 5759 cooperates with the network address translator 5753 to translate between whatever IP address space the programmer device 7000 may be part of on the external network 9999 and the IP address space of the internal network 599 such that the programmer device 7000 is caused to be presented on the internal network 599 at the same IP address as the network controller 500. However, in alternate embodiments, the programmer device 7000 may be caused to appear on the internal network 599 at a unique IP address assigned to it. With its presence brought about on the internal network 599, the programmer device 7000 is able to be operated to access the address proxy 1006*b* corresponding to the alarm panel 1000*b* at its IP address 192.168.0.7 on the internal network 599 of the alarm panel 1000*a*. From this point forward, the remote programming of the alarm panel 1000*b* proceeds in very much the same manner as was discussed in the example of FIG. 9.

Turning to FIG. 11, the alarm controller 100 accesses the alarm panel 1000*b* through the node address proxy 1007*b*. Packets transmitted by the alarm controller 100 to the node proxy 1007*b* at the IP address 192.168.0.2 of the network controller 500 are first converted from indicating the IP address of the network controller 500 to indicating the IP address associated with the alarm panel 1000*b* on the alarm network 1999. Then, the packets are prioritized by the traffic controller 5758, which will give them higher priority over packets associated with accesses to one of the address proxies 1006*b-f* if there is competing network traffic associated with one or more of the address proxies 1006*b-f*. From this point forward, the conveying of those packets to the alarm panel 1000*b* proceeds in very much the same manner as was discussed in the example of FIG. 9.

Figure 12:
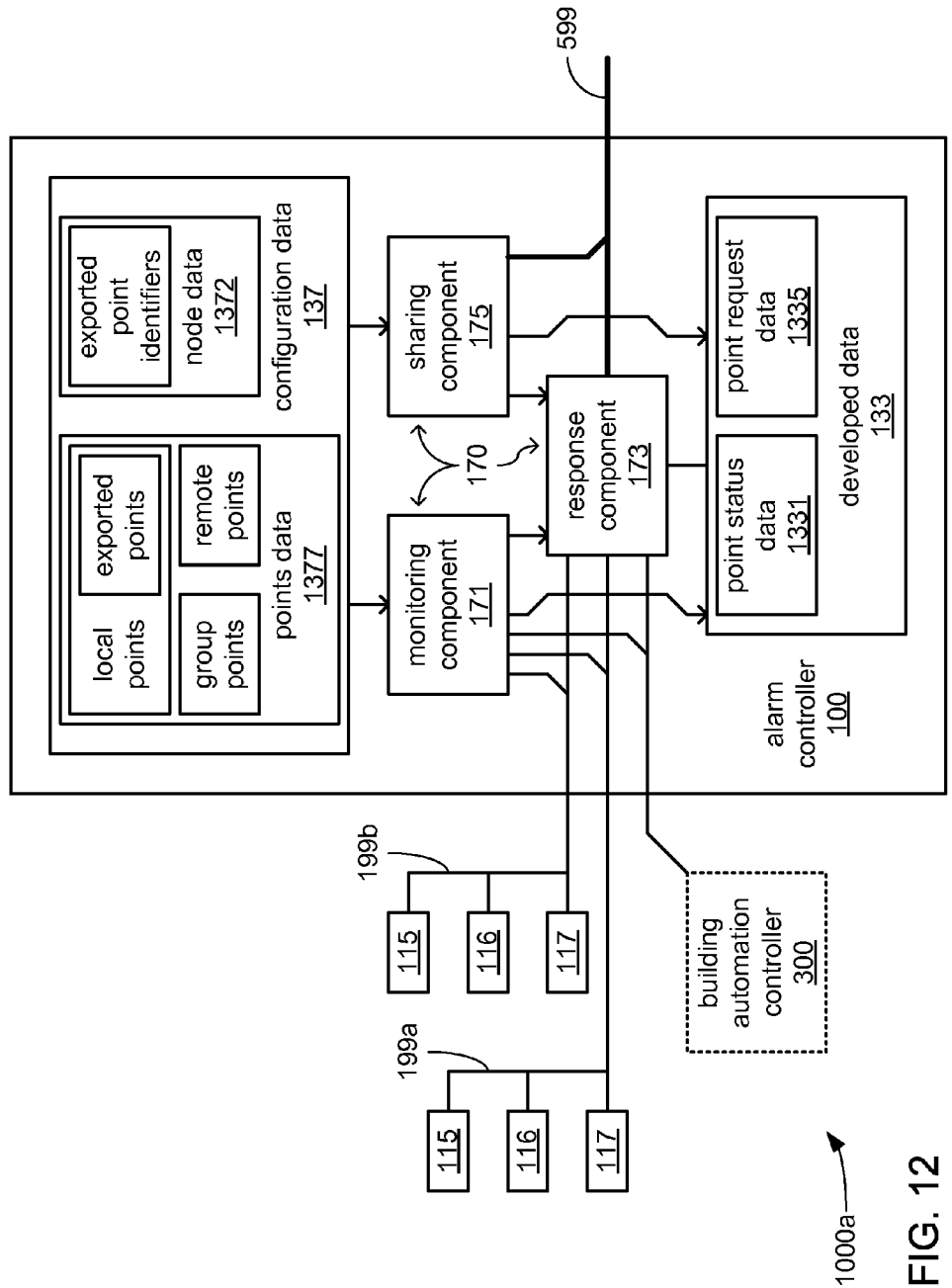

FIG. 12 is a block diagram of a portion of the alarm controller 100 of the embodiment of the alarm panel 1000*a* of FIG. 4 depicting aspects of its initialization to further prepare it for normal use in the alarm system 5000 as well as depicting aspects of such use. In such initialization, the network controller 100 enables the sharing of data concerning designated ones of the points coupled to it and alarm controller(s) 100 in one or more of the others of the alarm panels 1000*b-f*.

With the network controllers 500 of the alarm panel 1000*a* and at least one other of the alarm panels 1000*b-f* sufficiently initialized that communications across the alarm network 1999 are possible, the alarm controller 100 of at least the alarm panel 1000*a* is able to be further initialized to the extent of enabling the alarm panel 1000*a* to cooperate with other alarm panels to perform their function of monitoring for and responding to alarm conditions as part of the alarm system 5000. The monitoring component 171 retrieves at least the points data 1377 of the configuration data 137. As previously discussed, the points data 1377 includes indications of what points 115-117 are directly coupled to the alarm controller 100, by which of the point couplings 199*a* or 199*b* each is so coupled (again, there may be fewer or more than two point couplings), and/or what type of point each of these points are. The monitoring component 171 then commences monitoring these points for indications from at least the sensors 115 or the controls 116 of an alarm condition. As has been discussed, one or both of the point couplings 199*a* or 199*b* may be implemented as a digital serial bus or in some other form that enables each of the points 115-117 to be individually addressed. Indications of the status of such individually addressable points may be individually monitored and stored as part of a point status data 1331 of the developed data 133. However, as has also been discussed, one or both of the point couplings 199*a* or 199*b* may be implemented as a simple pair of wires to which multiple ones of the points 115-117 may be coupled in a manner that does not enable such individual addressability. In such cases, that entire point coupling with all of the points coupled thereto may be treated as a single point that is monitored and its status stored in the point status data 1331 as a single point status.

Upon detection of an alarm condition of one of these points by the monitoring component 171, the response component 173 is signaled with an indication of the type of alarm condition, possibly by providing an indication to the response component 173 of the type of point by which the alarm condition is detected. In response and depending on the nature of the alarm condition, the response component 173 may operate one or more of the annunciators 117 to signal an evacuation of the structure in which the alarm condition exists and/or to signal personnel within that structure to take some other action (e.g., shelter in place, don protective clothing, etc.). Where one or more of the annunciators 117 are coupled to the alarm controller by a point coupling that enables individual addressability of at least some of the annunciators 117, the response component 173 may selectively operate only some of the annunciators 117 within the structure as appropriate for the particular alarm condition. However, where one or more of the annunciators are coupled to the alarm controller 100 by a point coupling that is made up of a simple pair of wires by which all annunciators 117 coupled thereto must be operated together or not at all, the response component 173 may so operate all of such annunciators 117.

As previously depicted and discussed, the alarm panel 1000*a* may incorporate the building automation controller 300 coupled to the alarm controller 100 in some embodiments thereby enabling communications between the alarm panel 1000*a* and one or more components of an environmental system of a structure (e.g., air conditioning components, blowers, dampers, heaters, water pumps, lighting controls, thermostats, humidistats, hygrometers, etc.). In such embodiments, various individual components of an environmental system may each be treated as one or more points to enable monitoring of those components and/or to enable control of those components as part of responding to an alarm condition. By way of example, one or more thermostats may be monitored as points for indications of a temperature reading exceeding a particularly high threshold, or the status of a blower that is required to ensure a sufficient supply of fresh air to an isolated location may be monitored as a point. By way of another example, in response to detection of a fire, the response component may operate a damper and a blower as points to be controlled (not unlike operating an annunciator 117) to cause a flow of air to remove smoke, etc. Where such controllable components of an environmental system are to be operated to control their use in response to an alarm condition, such components may be treated as a pair of points, with one point being monitored to determine its status (e.g., on or off) and another point to operate a relay to control it (e.g., to turn it on or to turn it off).

As part of enabling sharing of points 115-117 among at least some of the alarm panels 1000*a-f*, the sharing component 175 also retrieves the points data 1377. As previously discussed, the points data 1377 includes indications of what ones of the points 115-117 that are locally coupled to the alarm controller 100 (e.g., "local points") of the alarm panel 1000*a* are to be made available (e.g., "exported points") for monitoring and/or for being controlled by one or more of the other alarm panels 1000*b-f*. It should be noted that local points associated with one or more components of an environmental system coupled to the alarm controller 100 via the building automation controller 300 may also be made available (e.g., "exported") for monitoring and/or for being controlled by one or more of the other alarm panels 1000*b-f*.

Also incorporated into the points data 1377 is an indication of what points coupled to the alarm controller(s) of one or more of the other alarm panels 1000*b-f* are of interest for being monitored for the alarm panel 1000*a* (e.g., "remote points"). In some embodiments, points that are exported by one of the alarm panels 1000*a-f* so as to make them available for access by others of the alarm panels 1000*a-f* are each identified by a combination of the node number of the alarm panel to which it is locally coupled and an identifier that distinguishes it from the other points also locally coupled to the same alarm panel. In other embodiments, points that are exported by one of the alarm panels 1000*a-f* are each given an identifier that is unique across all exported points throughout the alarm system 5000. It may be in such other embodiments that different ranges of such identifiers are associated with different ones of the alarm panels 1000*a-f* such that the identifier inherently provides an indication of which one of the panels 1000*a-f* an exported point is locally coupled to. Alternatively or additionally for such other embodiments, the sharing component 175 may also retrieve the node data 1372 of the configuration data 137 where the node data 1372 includes indications of which exported points are locally coupled to which of the alarm panels 1000*a-f*.

The sharing component 175 then transmits via the internal network 599 to one or more of the node proxies 1007*b-f* requests that the ones of the alarm panels 1000*b-f* corresponding to the node proxies 1007*b-f*, respectively, transmit indications of changes in state in particular ones of their locally coupled points back the alarm panel 1000*a* as those changes in state occur. More precisely, the sharing component 175 requests that others of the alarm panels 1000*b-f* provide the alarm panel 1000*a* with indications of instances in which one or more of their locally coupled points changes status to a state that indicates an alarm condition. In different possible embodiments, these requests may identify particular points by node number and whatever identifier is used to distinguish them from the other points at that node number, or these requests may identify particular points by identifiers that uniquely identify each point that has been exported. As has been described at length, these requests directed at one or more of the node proxies 1007*b-f* are then relayed by the network controller 500 of the alarm panel 1000*a* to one or more of the other alarm panels 1000*b-f* via the alarm network 1999. In some embodiments, such requests may take the form of packets transmitted via the network 599 that include a bit table in which there is a bit corresponding to each of the node proxies 1007*b-f*, with one or more of those bits set to a value indicating which one(s) of the node proxies 1007*b-f* the request is directed to.

The sharing component 175 may then await an indication from the network controller 500 of a receipt of an acknowledgment from the counterpart sharing component 175 of the one or more of the other alarm panels 1000*b-f* to which such requests were directed that the requests were successfully received. An error condition may develop where such an acknowledgement is not so received, and as previously discussed at length, a lack of acknowledgement may be taken as an indication that an alarm panel is not in attendance on the alarm network 1999. In such a situation, the sharing component 175 may signal the response component 173 of the failure of receipt of such an acknowledgement, and the response component 173 may operate the display 180 and/or provide some other form of signal to personnel of the apparent failure in communication with that other alarm panel.

A different error condition may develop where an acknowledgement is received, but the acknowledgement indicates that the request included one or more points that are not available. It may be that the request to be informed of alarm conditions for various points specifies one or more points that simply don't exist or that have not been exported by the alarm controller 100 of one of the alarm panels 1000*b-f* (at least not yet). In such a situation, the sharing component 175 may signal the response component 173 of the mismatch between points included in the request and points for which indications of alarm conditions are available, and the response component 173 may operate the display 180 and/or provide some other form of signal to personnel of such a mismatch. Such a mismatch may arise where changes are being made to the alarm system 5000 that include changes in what points are locally coupled to one or more of the alarm panels 1000*a-f* (e.g., removal of one or more points from a particular alarm panel) and/or changes in which points are exported by one or more of the alarm panels 1000*a-f*. Such changes to the alarm system 5000 would likely require changes to the programming of one or more of the alarm panels 1000*a-f*, and it may be that such a mismatch is caused by one of the alarm panels 1000*a-f* being reprogrammed before another.

Just as the sharing component 175 of the alarm panel 1000*a* directs such requests to its counterparts in others of the alarm panels 1000*b-f*, the sharing component 175 of the alarm panel 1000*a* also receives such requests from one or more of those counterparts. Presuming that received requests to provide indications of a change of state in exported ones of the points 115-117 coupled to the alarm panel 1000*a* to an alarm condition do not include points that don't exist or that have not been exported by the alarm controller 100 of the alarm panel 1000*a*, the sharing component 175 stores an indication of such requests as a point request data 1335 of the developed data 133.

The response component 173 retrieves the point request data 1335. In response to instances in which an exported point listed in the point request data 1335 indicates an alarm condition, the response component transmits an indication of that alarm condition of that point to whichever one(s) of the other alarm panels 1000*b-f* requested to be informed of such instances for that exported point. Correspondingly, the response component 173 may also receive an indication of a remote point exported by one of the other alarm panels 1000*b-f* entering a state indicative of an alarm condition where a request was made of that other alarm panel to do so by the sharing component 175 of the alarm panel 1000*a*. The response component 173 may respond to such an indication concerning that remote point in any of the same variety of ways in which it may respond to an indication of an alarm condition from one of the locally coupled points 115-117 (e.g., operate one or more of the annunciators 117 to signal an evacuation of a structure, etc.).

The points data 1377 may also specify one or more "group points" that are made up of multiple ones of the locally coupled points 115-117 and/or points associated with environmental system components locally coupled via the building automation controller 300 (otherwise known simply as "local points"). The formation of a group point allows multiple otherwise separate points to be exported for access by one or more of the other alarm panels 1000*b-f* as a single point, rather than separately exporting all of the points within that group. Exporting multiple points as a group may be deemed desirable to reduce network traffic on the alarm network 1999 by reduce the quantity of total exported points for which status information is transmitted. Where one of the points of a group enters a state that indicates an alarm condition, the group point of which it is a part is correspondingly transitioned into a state indicating an alarm condition.

Figure 13:
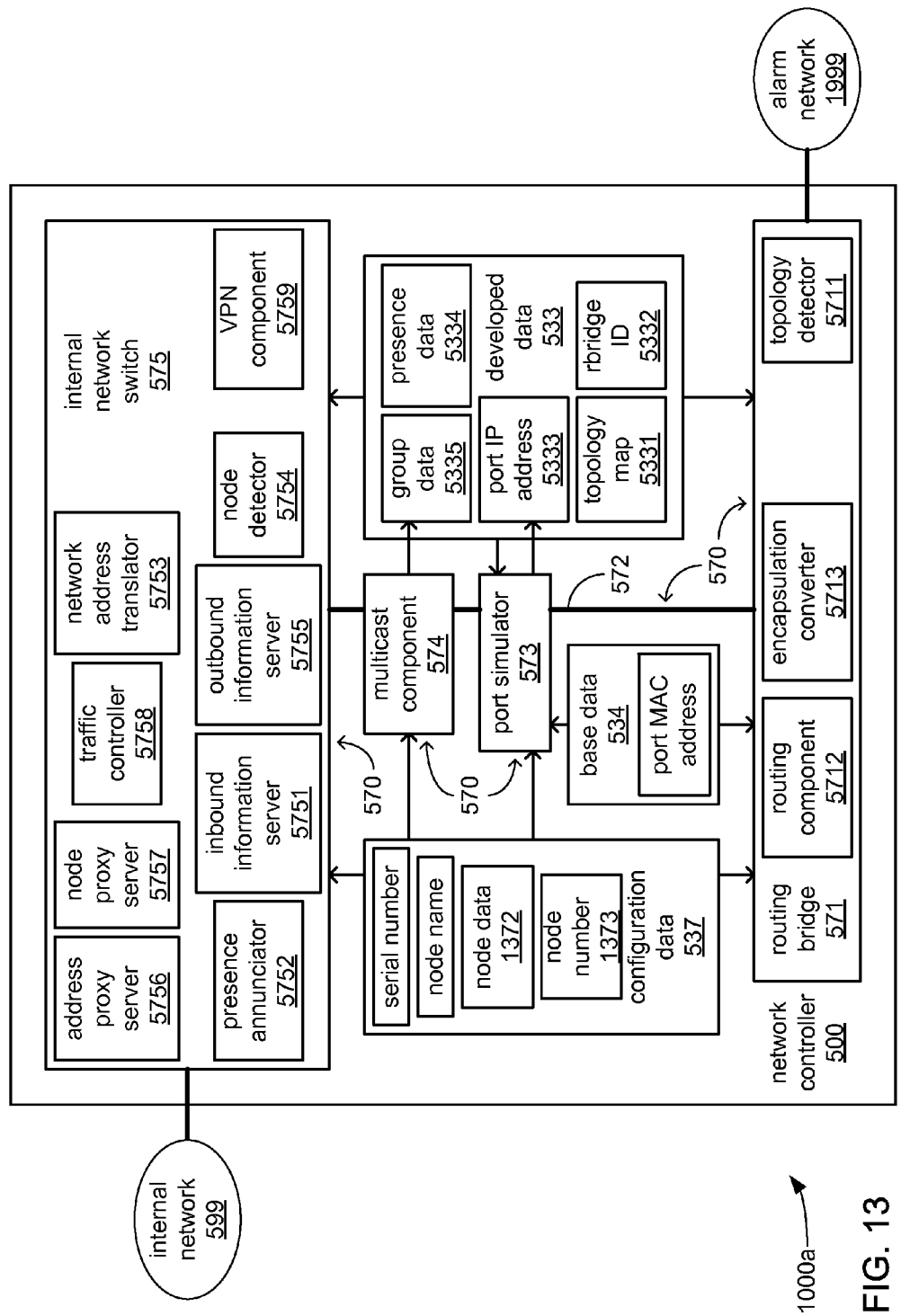

FIG. 13 is a block diagram of a portion of the network controller 500 of the embodiment of the alarm panel 1000*a* of FIG. 4 similar to FIGS. 5 and 7-11, and depicting further aspects of its initialization to further prepare it for normal use as part of the alarm system 5000. In such initialization, the network controller 500 enables the use of multicasting on the alarm network 1999.

A multicast component 574 retrieves a portion of the node data 1372 of the configuration data 537 that includes indications of one or more groups of nodes to which multicast transmissions of packets are to be made. In a manner not unlike the port simulator 573, the multicast component 574 may derive an IP address to serve as the specified destination of such multicast packets, or the node data 1372 may provide an indication of what such destination IP address(es) should be. The multicast component 574 then transmits individual packets to each of the members of the one or more groups indicated in the node data 1372 to provide them with an indication of their inclusion in one or more groups and an indication of what IP address(es) are associated with those groups. As will be familiar to those skilled in the art of multicasting on a network, any reliable multicast protocol that does not require event acknowledgement/notification may be used between the network controller 500 and the alarm controller 100.

Although the node data 1372 may provide definitions of groups of nodes to which multicast packets are to be transmitted for any of a number of reasons, it is envisioned that use of multicasting is at least primarily to increase efficiency with which data concerning the status of points is conveyed across the alarm network 1999. Stated differently, it may be deemed desirable to reduce the network traffic required on the alarm network 1999 for one alarm panel to send information concerning the status of one or more of its locally connected points to more than one of the other alarm panels.

Further, it is envisioned that the use of multicasting to a defined group of alarm panels may be deemed more desirable than broadcasting to all of the alarm panels as it is envisioned that there may be subsets of alarm panels in a typical installation of the alarm system 5000 that tend to communicate among themselves far more frequently than to others of the alarm panels in that installation. This may arise, for example, in an alarm system that includes alarm panels distributed among multiple buildings (e.g., a campus-wide alarm system). In such an example alarm system, it is likely that alarm panels installed within one of the buildings will be in more frequent contact with each other than with any alarm panel installed in another building. More detailed information about an alarm condition detected by a specific sensor of one of those alarm panels in that building is likely to be shared with others of the alarm panels within that building to possibly coordinate an evacuation of that building, while a more general indication of alarm (e.g., an indication of an alarm panel having entered into an alarm state) may be transmitted to alarm panels in other buildings to simply inform other personnel in those other buildings of that alarm condition.

Figure 14:
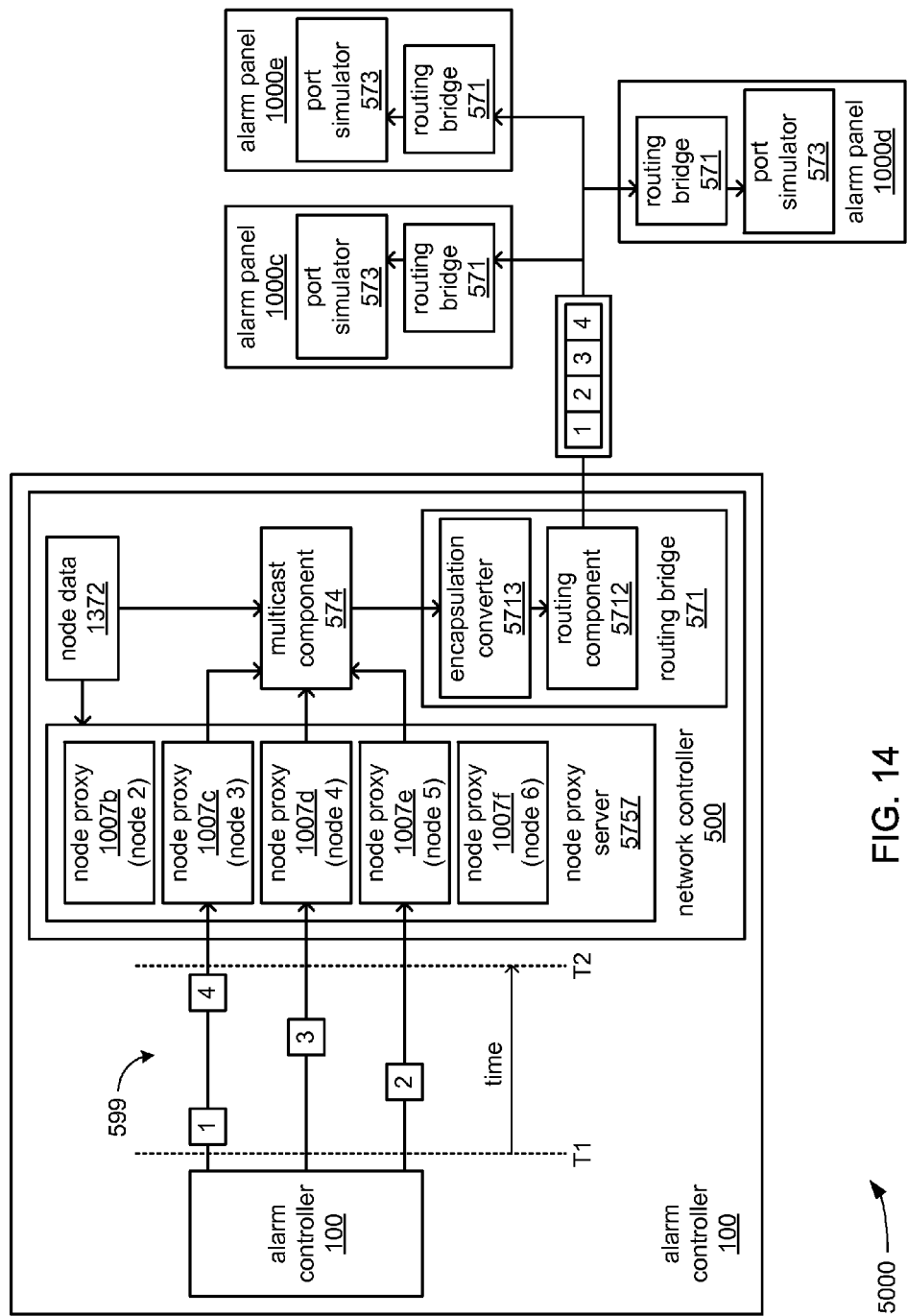
FIG. 14 illustrates an embodiment of an alarm panel.

FIG. 14 is a block diagram of a configuration of components in an example embodiment of the alarm panel 1000a, and the manner in which those components may interact to perform multicasting in which originally separate unicast packets (packets directed to a single destination vs. multicast or broadcast packets to multiple destinations) on the internal network 599 are combined in multicast packets transmitted across the alarm network 1999. In the depicted example, multicasting in which the alarm panels 1000c-e are designated as belonging to a multicast group has been set up by the multicast component 574 and/or the routing bridge 571 of the network controller 500 of the alarm panel 1000a. As depicted, the alarm controller 100 of the alarm panel 1000a transmits multiple unicast packets (numbered simply as "1" through "4") via the internal network 599 that are directed to different ones of the node proxies 1007c-e provided by the node proxy server 5757 at the IP address of the network controller 500, and corresponding to the members of that multicasting group.

As has been previously discussed at length, the destinations of each of these unicast packets is altered from the IP address of the network controller 500 to the IP addresses of the particular ones of the alarm panels 1000c-e that correspond to the particular ones of the node proxies 1007c-e to which each of these unicast packets were directed. These unicast packets (after also being subjected to network address translation and prioritization over other network traffic) are provided as unicast frames to the multicast component 574. In response to the destination IP addresses of each of these unicast frames indicating a member of the multicast group, the multicast component combines these individual packets into a single multicast frame directed at the multicast destination IP address given to the multicast group, and conveys this multicast frame to the routing bridge 571. The encapsulation converter 5713 encapsulates the multicast frame in a packet into which is incorporated a multicast destination rbridge ID also given to the multicast group to cause the now-encapsulated multicast frame to be routed to each of the routing bridges 571 of the members of that group, where each will provide the multicast frame within the multicast packet to its corresponding internal network switch 575.

This now-encapsulated multicast packet is then transmitted onto the alarm network 1999 and is routed to the routing bridges 571 of each of the alarm panels 1000c-e through the alarm network 1999. Upon being received by each of the routing bridges 571 of each of the alarm panels 1000c-e, the encapsulation is undone to retrieve the multicast frame, and then the multicast frame is accepted at the port simulator 573 of each of those alarm panels and passed on to the internal network switch 575 of each of those alarm panels, thereby completing delivery of the multicast packet.

As also depicted, the manner in which what unicast packets transmitted by the alarm controller 100 are selected for inclusion in a multicast packet is at least partially time dependent. More specifically, in some embodiments, the multicast component 574 may select ones of the select unicast packets (received by the multicast component 574 as unicast frames, as has been described) for inclusion in a multicast packet that will be transmitted by the routing bridge 571 from among ones of the unicast packets received by the network controller 500 within a specified interval of time (e.g., from time T1 to time T2, as depicted). This is in addition to limiting the unicast packets that are selected to those directed towards alarm panels that are part of a multicast group (e.g., the example group of alarm panels 1000c-e). Through such use of multicasting and of such combining of multiple unicast packets received via the internal network 599, network traffic occurring on the alarm network 1999 is reduced.

As also depicted in FIG. 14, in combining the unicast packets "1" through "4" the order in which they were received by the network controller 500 is maintained in the formation of the multicast packet into which they are combined and that is transmitted on the alarm network 1999. As will be familiar to those skilled in the art, it may be deemed desirable to ensure that the order in which information and/or commands related to a response to an alarm condition be preserved to ensure that alarm conditions of particular points are responded to in an appropriate order and/or that commands meant to be acted upon in a particular order will be acted upon in a particular order. By way of example, a command to operate a point corresponding to a damper to cause the damper to open may need to be acted upon before a command to operate another point corresponding to a blower to cause the blower to start. If those commands are acted upon out of that order, then the blower may force air against the damper while it is still in a closed state, thereby possibly damaging it such that it cannot be opened.

Figure 15:
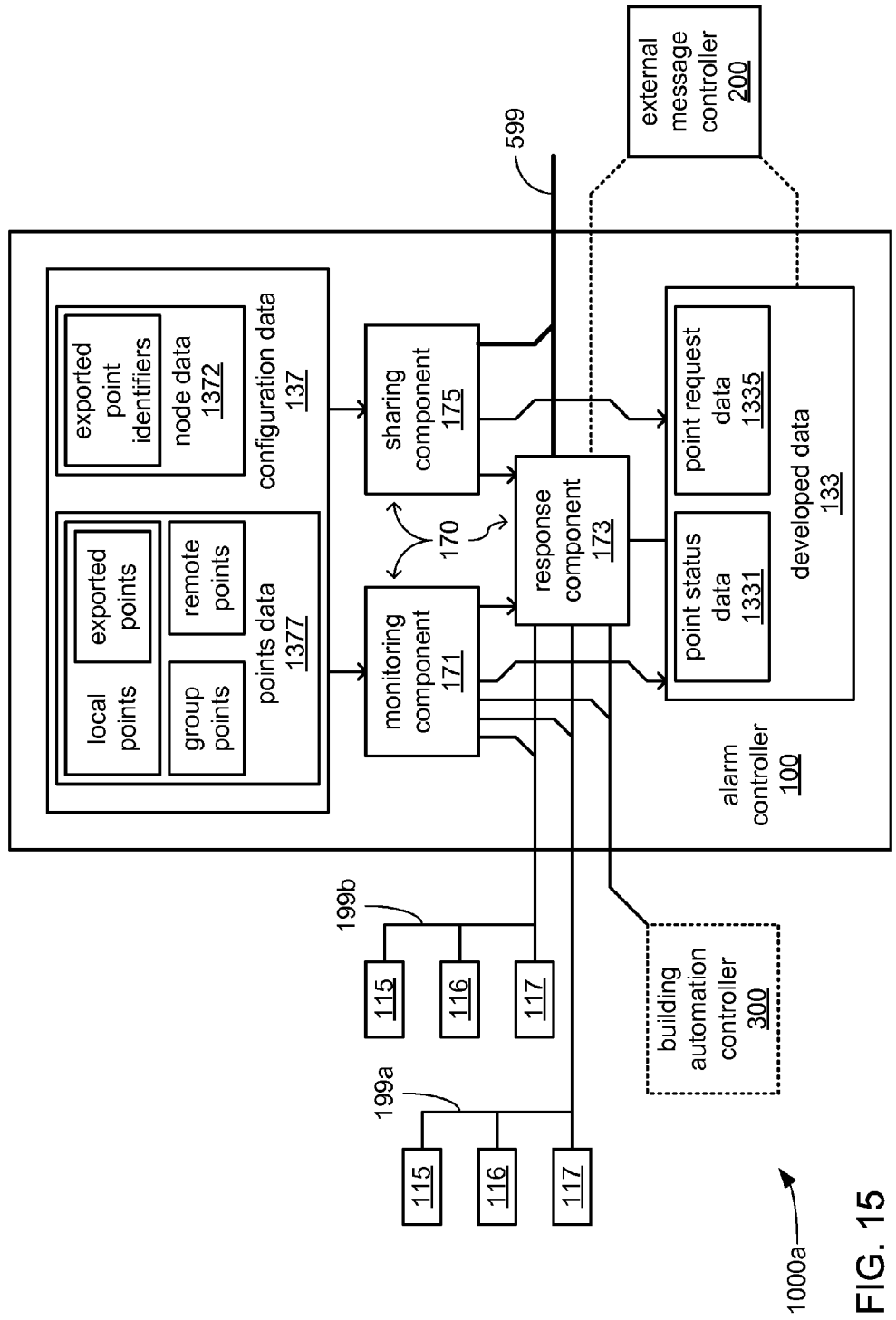
FIGS. 15-16 each illustrate a portion of the embodiment of FIG. 4.

FIG. 15 is a block diagram of a portion of the alarm controller 100 of the embodiment of the alarm panel 1000a of FIG. 4 similar to FIG. 12, and depicting aspects of conveying a signal beyond the alarm system 5000 to alert personnel of an alarm condition. The signal may include a packet incorporating data representing audio in the form of coded tones and/or synthesized voice transmitted to a selected IP address of a computing device outside of the alarm system 5000, possibly a computing device on the Internet. Alternatively or additionally, the signal may include a packet incorporating text and/or message in some other form.

As depicted and as previously discussed, the alarm panel 1000*a* may incorporate the external message controller 200 coupled to the alarm controller 100 to cause the transmission of such a message. In some embodiments, the external message controller 200 may be a physically distinct component incorporating its own processor component and monitoring one or more aspects of the operation of the alarm controller 100 (e.g., monitoring the contents of data indicating the presence or absence of an alarm condition, such as the point status data 1331) to autonomously determine whether or not to transmit such a message. In other embodiments, the external message controller 200 may be a component of the control routine 170, along with the monitoring component 171, the response component 173 and the sharing component 175, and may be signaled by the response component 173 to transmit such a message.

Regardless of the exact form of the external message controller 200, upon being triggered to transmit such a message, the external message controller 200 employs the connection of the alarm controller 100 to the internal network 599 to transmit a packet containing the message. The packet incorporates an indication of a destination IP address of a remotely located computing device that is outside of the alarm system 5000. More specifically, the IP address of that remote computing device does not correspond to any IP address of any component or device on the internal network 599 of the alarm panel 1000*a* or on the alarm network 1999. As will be explained in detail, the network controller 500 of at least the alarm panel 1000*a*, and possibly also of one or more of the other alarm panels 1000*b-f*, act to cause the message to be conveyed to an external network (e.g., the external network 9999).

Figure 16:
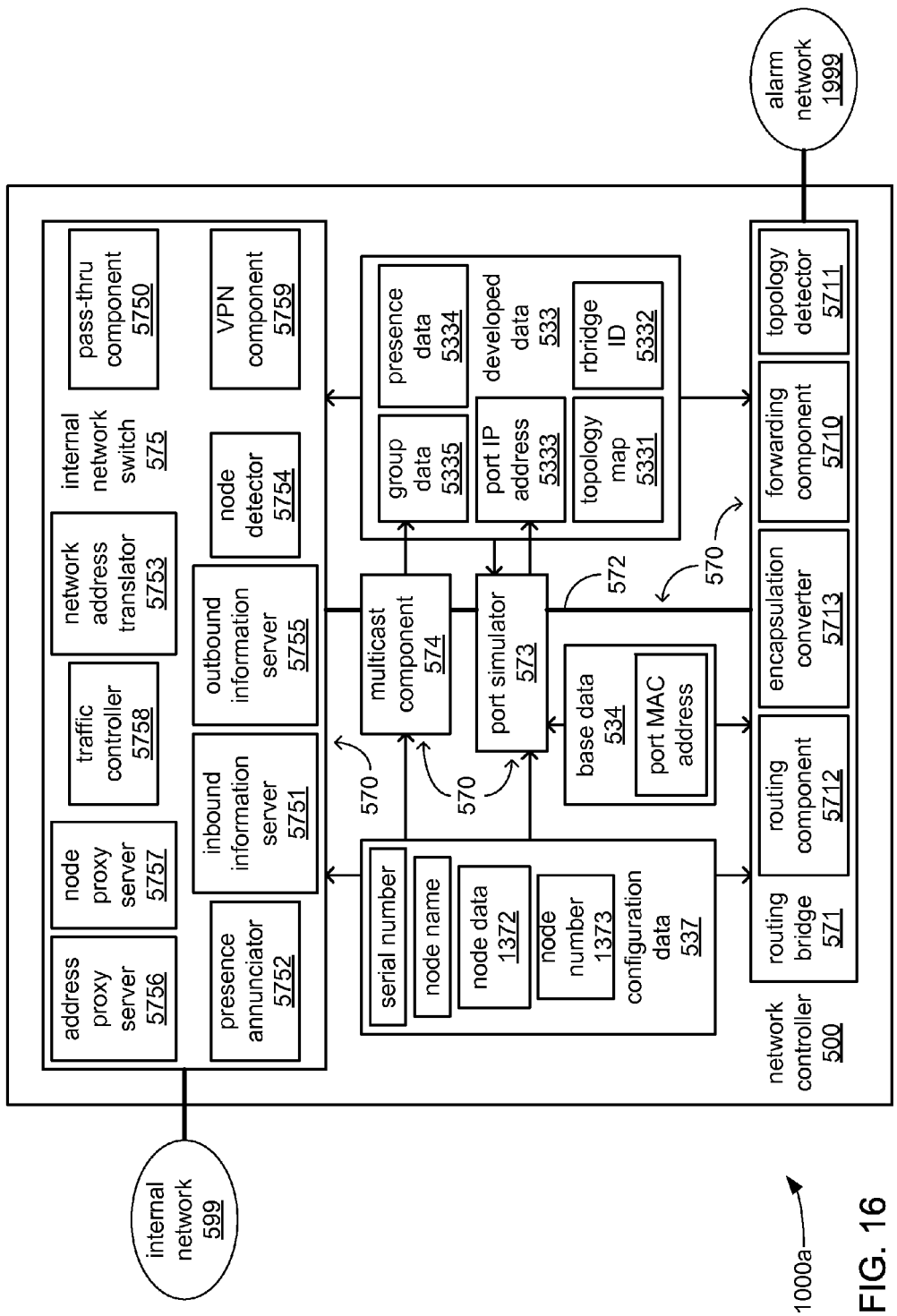

FIG. 16 is a block diagram of a portion of the network controller 500 of the embodiment of the alarm panel 1000*a* of FIG. 4 similar to FIGS. 5, 7-11 and 13, and depicting aspects of relaying the message generated by the external message controller 200. As depicted the internal network switch 575 may incorporate a pass-thru component 5750 to monitor the internal network 599 for packets directed towards IP addresses that are not present on the internal network 599 and to accept them as if those packets were directed towards it. Unlike either the address proxy server 5756 or the node proxy server 5757, the pass-thru component 5750 does not alter the destination IP address of such packets. As has been discussed, one or more of the network controllers 500 of the alarm panels 1000*a-f* may be coupled to an external network (e.g., the external network 9999). In embodiments where the network controller 500 of the alarm panel 1000*a* is itself coupled to an external network, then the pass-thru component 5750 may route such packets as the one conveying the message generated by the external message controller 200 towards the external network to which the network controller 500 is coupled.

However, in embodiments where the network controller 500 of the alarm panel 1000*a* is not coupled to any external network, then the pass-thru component 5750 may route such packets as frames to the routing bridge 571 of the network controller 500. In such embodiments, the routing bridge 571 may incorporate a forwarding component 5710 to monitor for frames directed towards IP addresses that are not present on the alarm network 1999 and retrieves an indication from the topology map 5331 of which of the other alarm panels 1000*b-f* has a network controller 500 that is coupled to an external network and is most closely coupled to the alarm panel 1000*a* on the alarm network 1999. The forwarding component 5710 then encapsulates such frames into packets into which is incorporated the rbridge ID 5332 of the routing bridge 571 of the network controller 500 that is coupled to an external network and is most closely coupled to the alarm panel 1000*a*. The routing bridge 571 then transmits such packets onto the alarm network 1999. Thus, the message generated by the external message controller 200 is encapsulated into a packet and transmitted onto the alarm network 1999 towards such a controller 500 by the forwarding component 5710.

Upon being received by the routing bridge 571 having the rbridge ID 5332 incorporated into the packet conveying the message from the external message controller 200, the encapsulation is undone and the message from the external message controller 200 is conveyed by the forwarding component 5710 of that routing bridge 571 as a frame to its corresponding one of the internal network switch 575. The pass-thru component 5750 of that internal network switch 575 then routes that frame to the external network coupled to that network controller 500 for transmission as a packet conveying that message towards its intended IP address.

Figure 17:
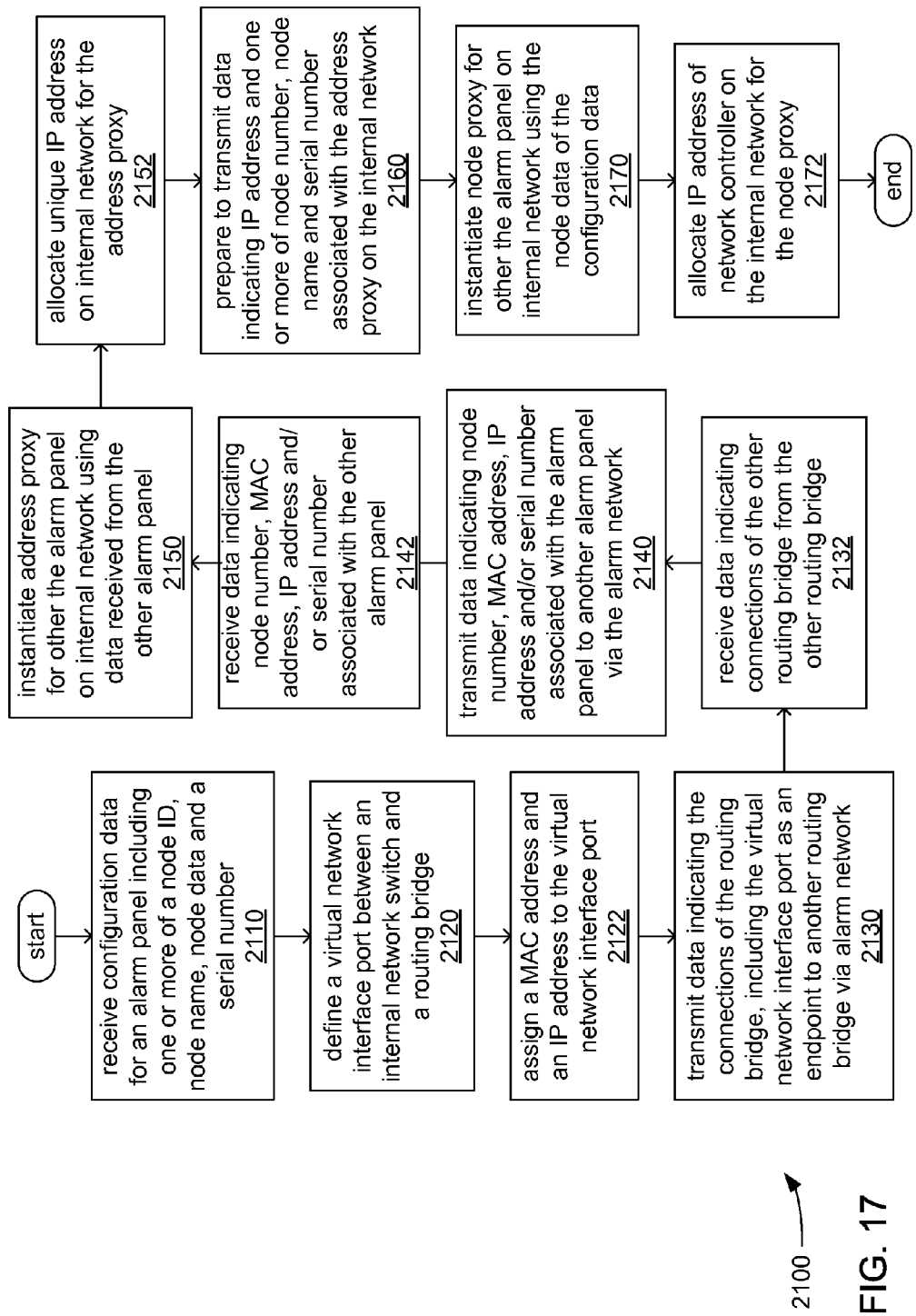
FIGS. 17-22 each illustrate an embodiment of a logic flow.

FIG. 17 illustrates an embodiment of a logic flow 2100. The logic flow 2100 may be representative of some or all of the operations executed by one or more embodiments described herein. More specifically, the logic flow 2100 may illustrate operations performed by logic of the network controller 500, possibly including hardware-based logic and/or logic implemented as instructions of the base routine 540 and/or the control routine 570 executed by the processor component 550.

At 2110, a network controller of an alarm panel of an alarm system (e.g., the network controller 500 of one of the alarm panels 1000*a-f* of the alarm system 5000) receives configuration data associated with the alarm panel including one or more of a node number or node name of the alarm panel, a node data concerning all of the alarm panels in the alarm system, and a serial number possibly of an alarm controller of the alarm panel (e.g., the alarm controller 100). As has been discussed, the network controller may receive such configuration data alongside the alarm controller from a programmer device (e.g., the programmer device 7000), or may receive such configuration data as relayed through the alarm controller from that programmer device.

At 2120, the network controller defines a virtual network interface port interposed between an internal network switch implemented by the network controller to form an internal network of the alarm panel and a routing bridge implemented by the network controller to cooperate with counterpart routing bridges of the other alarm panels to form an alarm network of the alarm system by which the alarm panels are coupled. At 2122, the network controller assigns a MAC address and an IP address of the IP address space for the alarm network to the virtual network interface port. As has been discussed, once given a MAC address and an IP address, the virtual network interface port has the characteristics expected of an endpoint device coupled to the routing bridge, thereby effectively putting the internal network switch on the alarm network as an endpoint device.

At 2130, the routing bridge of the network controller transmits data concerning its connections to another routing bridge of another network controller of another alarm panel on the alarm network, including data concerning the endpoint device simulated by the virtual network interface port. At 2132, the routing bridge of the network controller receives data from the other routing bridge concerning its connections. As has been discussed, such exchanges of data concerning connections of routing bridges on the alarm network provides each network controller of each alarm panel with an indication of the topology of the alarm network. Further, amidst this exchange of data concerning routing bridge connections, each routing bridge of the alarm network may be assigned a unique rbridge identifier for use in designated a destination routing bridge when routing messages conveying packets among the routing bridges.

At 2140, the network controller transmits data associated with the alarm panel to one or more other network controllers, including one or more of the node number and/or node name of the alarm panel, the IP address assigned to its virtual network interface port, and the serial number that may be associated with its alarm controller. At 2142, the network controller receives such information from the network controller of at least one of the other alarm panels. As has been discussed, such information is exchanged as part of each network controller acting to detect the presence (or lack thereof) of the other alarm panels on the alarm network.

At 2150, the network controller instantiates an address proxy for one of the other alarm panels on its internal network using at least some of the data received from that other alarm panel amidst the exchanges of data among the alarm panels to detect the presences of the others. At 2152, the network controller (or possibly, the alarm controller) allocates a unique IP address on the internal network for the address proxy. As has been discussed, one or the other of the network controller and the alarm controller may implement a DHCP server to allocate IP addresses on the internal network. At 2160, the network controller prepares to transmit data associated with the address proxy (and thus, associated with the other alarm panel) on the internal network, including one or more of the node number and/or node name of the other alarm panel, the IP address assigned to the address proxy, and the serial number that may be associated with the alarm controller of the other alarm panel.

At 2170, the network controller instantiates a node proxy for the other alarm panel (the same alarm panel for which the address proxy was instantiated) on its internal network using information concerning the other alarm panels of the alarm system in the configuration data. At 2172, the network controller allocates its own IP address on the internal network for the node proxy such that the node proxy becomes accessible at the same IP address as the network controller, itself.

Figure 18:
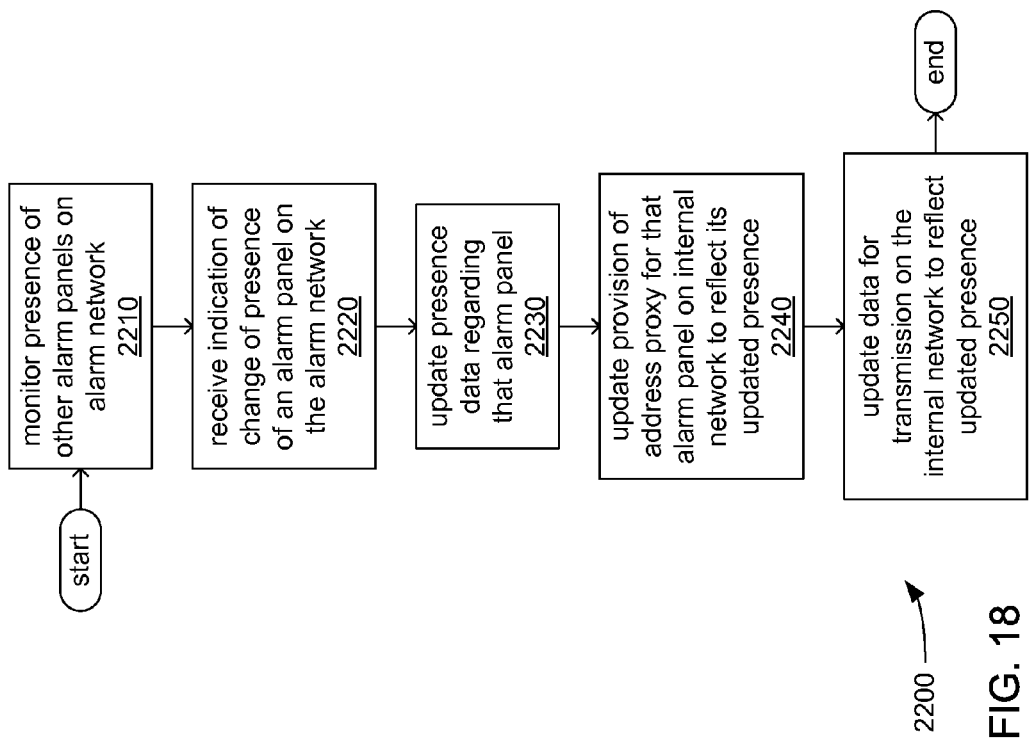

FIG. 18 illustrates an embodiment of a logic flow 2200. The logic flow 2200 may be representative of some or all of the operations executed by one or more embodiments described herein. More specifically, the logic flow 2200 may illustrate operations performed by logic of the network controller 500, possibly including hardware-based logic and/or logic implemented as instructions of the control routine 570 executed by the processor component 550.

At 2210, a network controller of an alarm panel of an alarm system (e.g., the network controller 500 of one of the alarm panels 1000*a-f* of the alarm system 5000) monitors the presence of other alarm panels on an alarm network of the alarm system (e.g., the alarm network 1999), and receives an indication of a change in the presence of another alarm panel on the alarm network at 2220. As has been discussed, a node detector of the network controller (e.g., the node detector 5754) may transmit various queries on a recurring basis for information concerning the presence or absence of the other alarm panels, possibly in the form of ARP and/or DNS requests. However, as has also been discussed, updated information as to the loss of presence of another alarm panel may be provided as a result of a detected error in an attempt to transmit data to that other alarm panel, such as the lack of periodic inter-fire panel "liveness" broadcasts to indicate the functioning of a particular alarm panel.

At 2230, regardless of the exact nature of the indication of the change in presence of the other alarm panel, the network controller updates a presence data regarding that change in presence of that other alarm panel. As has been discussed, such presence data may be combined with other received data concerning the topology of the alarm network to provide a more complete picture of such changes.

At 2240, the provision of an address proxy for that other alarm panel on the internal network is updated to reflect its presence or lack thereof. As has been discussed, each address proxy is either presented or not presented based on whether or not its associated alarm panel is present or not present on the alarm network.

At 2250, data for transmission on the internal network that reflects the presence or lack thereof of the other alarm panel is updated. As previously explained, the network controller may implement an inbound information server to transmit indications on the internal network as to what ones of the other alarm panels are able to be reached through the address proxies, possibly responding to ARP, DNS and/or other types of requests.

Figure 19:
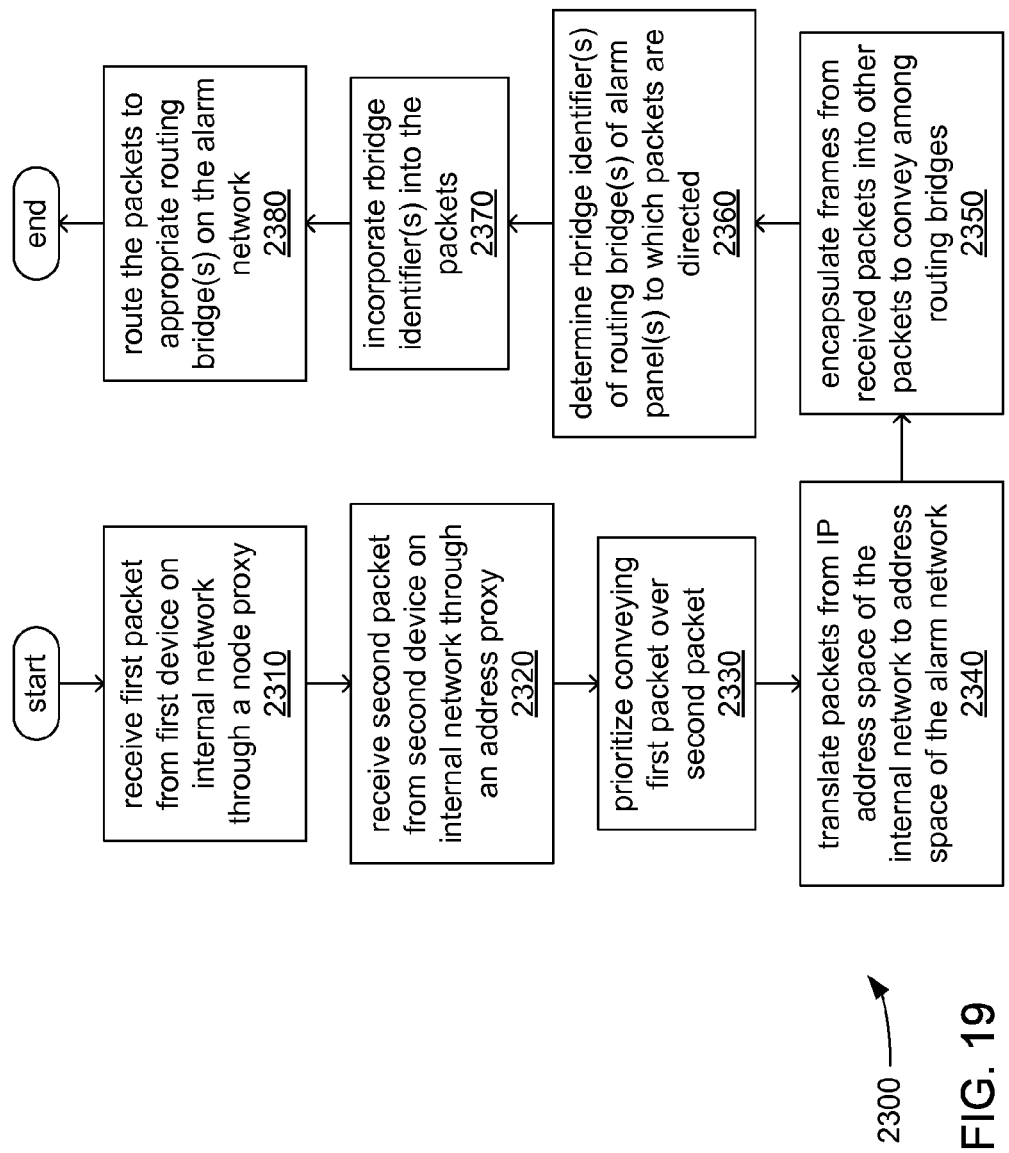

FIG. 19 illustrates an embodiment of a logic flow 2300. The logic flow 2300 may be representative of some or all of the operations executed by one or more embodiments described herein. More specifically, the logic flow 2300 may illustrate operations performed by logic of the network controller 500, possibly including hardware-based logic and/or logic implemented as instructions of the control routine 570 executed by the processor component 550.

At 2310, a network controller of an alarm panel of an alarm system (e.g., the network controller 500 of one of the alarm panels 1000*a-f* of the alarm system 5000) receives a first packet from a first device (e.g., the alarm controller 100) on an internal network of the alarm panel through a node proxy presented by the network controller on the internal network. As has been discussed, a set of node proxies are provided by the network controller on the internal network to allow the alarm controller thereof to access locally available proxies for other alarm panels at a common IP address on the internal network, thus alleviating the need to add the complexities of discovering separate IP addresses for each of those proxies, and allowing the alarm controller to employ a protocol in which the alarm controller addresses those different proxies (and thus, addresses different ones of those other alarm panels) by referring to their node numbers (e.g., via a bit table made up of bits corresponding to each node).

At 2320, the network controller receives a second packet from a second device (e.g., the programmer device 7000) on the internal network through an address proxy presented by the network controller on the internal network. As has been discussed, a set of address proxies are provided by the network controller on the internal network, side-by-side with the node proxies, to allow other devices to access locally available proxies for those other alarm panels at separate and unique IP addresses on the internal network. Unlike the node proxies, details of the address proxies are made available to devices on the internal network in response to queries (e.g., ARP, DNS and/or other types of requests) made to an inbound information server implemented by the network controller on the internal network.

At 2330, the first and second packets are prioritized by the network controller, with the conveying of the first packet being prioritized higher than the second. As has been discussed, the network controller may slow, delay or stop conveyance of the second packet to another alarm panel on an alarm network of the alarm system in favor of the conveying the first packet, possibly as part of an implementation of a quality of service algorithm in which packets directed towards the node proxies are guaranteed a specified minimum bandwidth and packets directed towards the address proxies are provided with whatever bandwidth remains.

At 2340, the first and second packets are subjected to address translation by a network address translator of the network controller to convert them from being packets addressed to their respective proxies at IP addresses in the IP address space of the internal network to IP addresses in the address space used in the alarm network that are associated with whichever alarm panel(s) are represented by those proxies. As previously discussed, the network address translator of each of the network controllers of each of the alarm panels enables their respective internal networks to have IP address spaces that are unconnected with the IP address space employed on the alarm network.

At 2350, the first and second packets are received as frames by a routing bridge of the network controller and are encapsulated into packets for being conveyed among the routing bridges of the network controllers of the alarm panels. At 2360, as part of this encapsulation into packets, rbridge identifiers associated with whichever alarm panels these packets are directed to are determined, from the IP addresses of the frames that they encapsulate, and those rbridge identifiers are then incorporated into those packets. At 2360, using the rbridge identifiers incorporated into each of the messages, the network controller's routing bridge routes the packets to appropriate routing bridge(s) on the alarm network.

Figure 20:
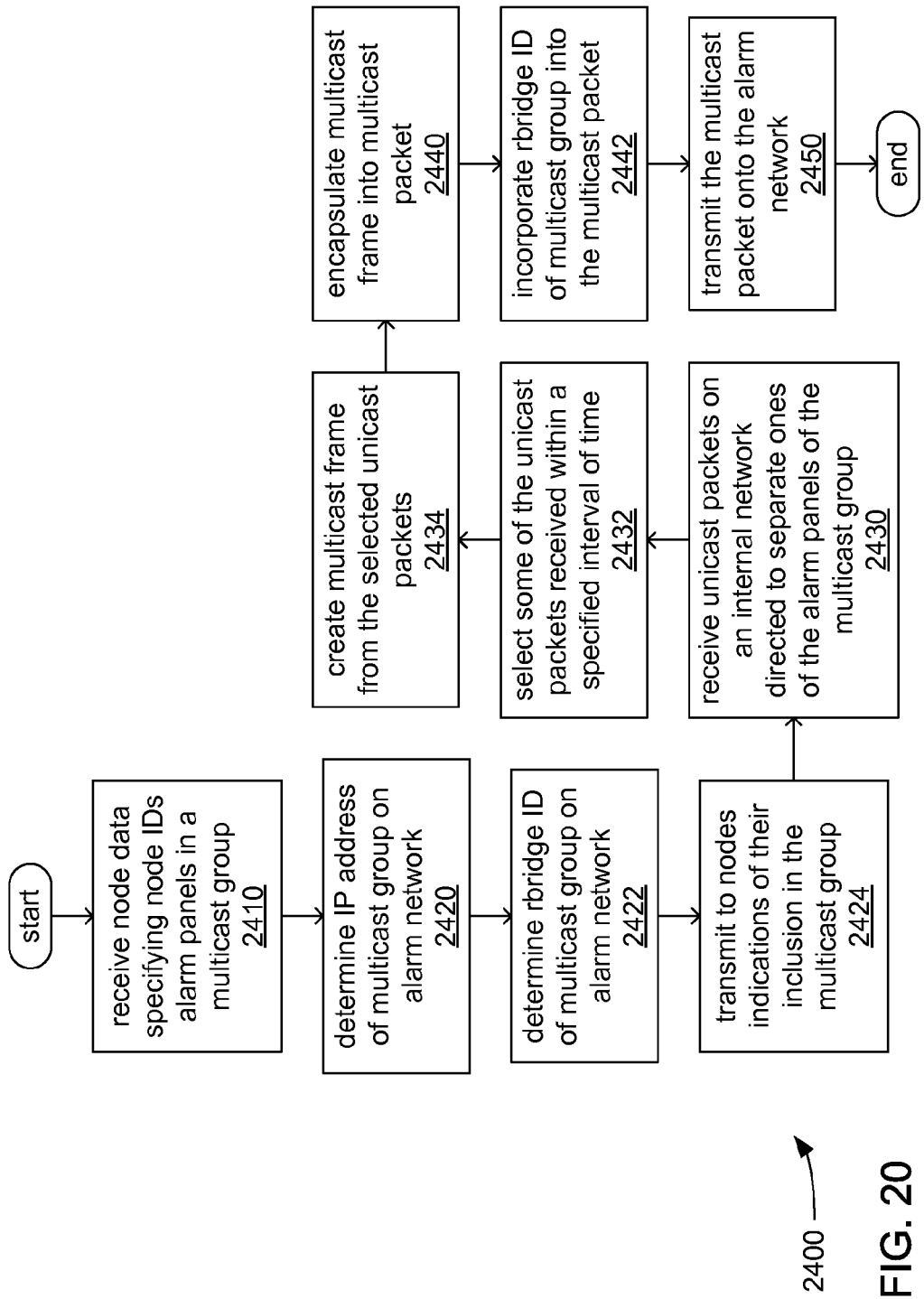

FIG. 20 illustrates an embodiment of a logic flow 2400. The logic flow 2400 may be representative of some or all of the operations executed by one or more embodiments described herein. More specifically, the logic flow 2400 may illustrate operations performed by logic of the network controller 500, possibly including hardware-based logic and/or logic implemented as instructions of the base routine 540 and/or the control routine 570 executed by the processor component 550.

At 2410, a network controller of an alarm panel of an alarm system (e.g., the network controller 500 of one of the alarm panels 1000a-f of the alarm system 5000) receives configuration data associated with the alarm panel including a node data concerning all of the alarm panels in the alarm system and specifying one or more multicast groups that the alarm panel is to transmit multicast packets to on an alarm network of the alarm system. As has been discussed, the network controller may receive such configuration data alongside an alarm controller of the alarm panel (e.g., the alarm controller 100) from a programmer device (e.g., the programmer device 7000), or may receive such configuration data as relayed through the alarm controller from that programmer device.

At 2420, the network controller determines the IP address of the multicast group on the alarm network to which the multicast packets are to be directed, and may determine the rbridge ID of the multicast group to incorporate into those multicast packets at 2422. At 2424, the network controller transmits indications to each of those other alarm panels of the fact of their inclusion in the multicast group and conveying to them the IP address and/or rbridge ID to which the multicast packets will be directed on the alarm network.

At 2430, the network controller receives unicast packets directed to separate ones of the alarm panels that are members of the multicast group via an internal network of the alarm panel into which the network controller is incorporated. As has been discussed at length, the manner in which such unicast packets are directed towards specific alarm panels on the internal network is by directing those unicast packets to either a node proxy (e.g., one of the node proxies 1007b-f) or to an address proxy (e.g., one of the address proxies 1006b-f).

At 2432, the network controller selects some of those unicast packets that are received within a specified interval of time for inclusion into a multicast packet to be transmitted on the alarm network, and then creates that multicast packet from those selected unicast packets at 2434. As has been discussed, in creating that multicast packet, the order in which the selected unicast packets is received by the network controller is preserved in the order in which the unicast packets are combined to form the multicast packet.

At 2440, the multicast packet is created by encapsulating a multicast frame of the content of the selected unicast packets, and the rbridge ID of the multicast group is incorporated into the multicast packet at 2442. The multicast packet is then transmitted onto the alarm network at 2450.

Figure 21:
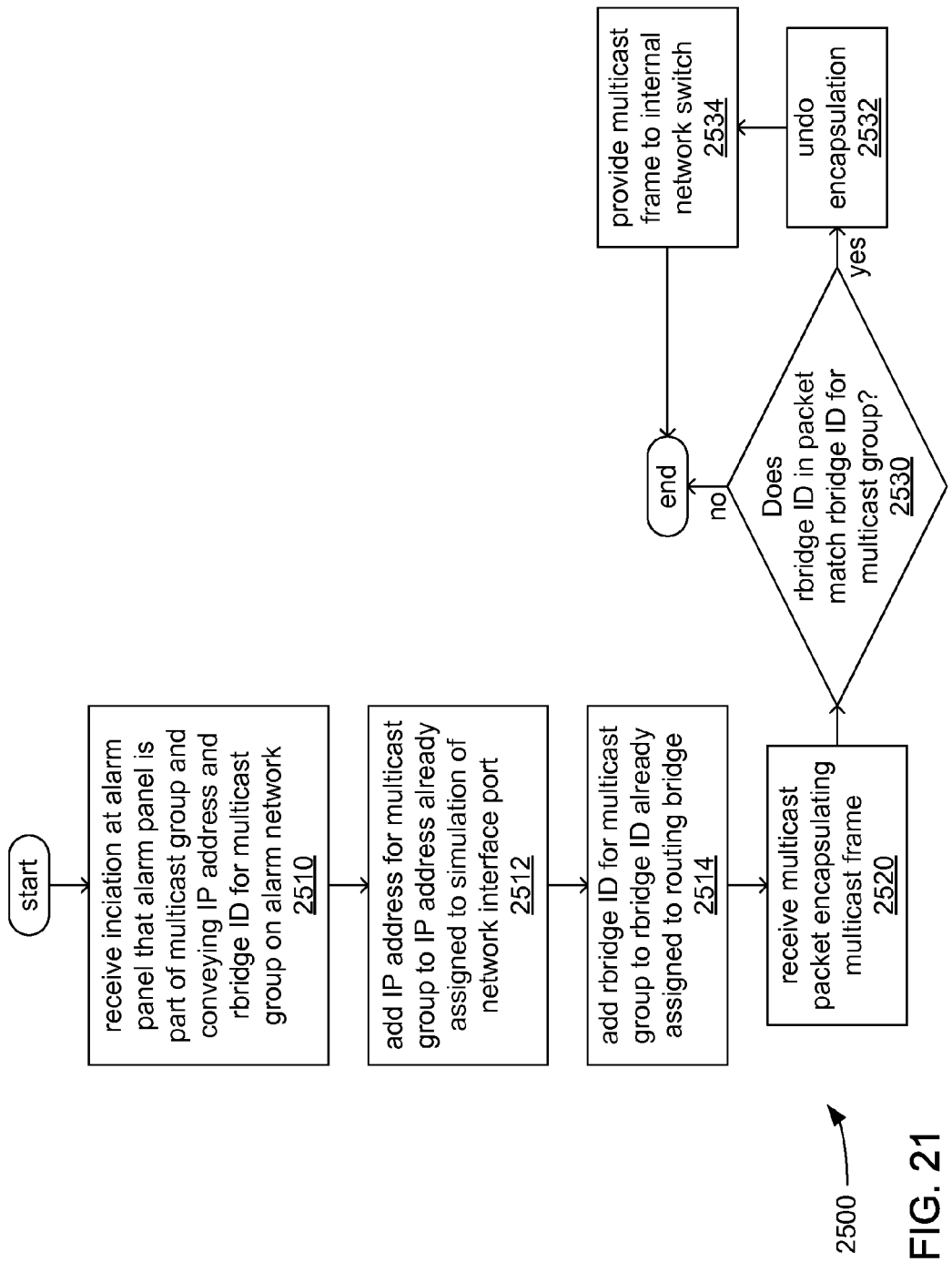

FIG. 21 illustrates an embodiment of a logic flow 2500. The logic flow 2500 may be representative of some or all of the operations executed by one or more embodiments described herein. More specifically, the logic flow 2500 may illustrate operations performed by logic of the network controller 500, possibly including hardware-based logic and/or logic implemented as instructions of the control routine 570 executed by the processor component 550.

At 2510, a network controller of an alarm panel of an alarm system (e.g., the network controller 500 of one of the alarm panels 1000a-f of the alarm system 5000) receives an indication via an alarm network (e.g., a packet via the alarm network 1999) indicating that the alarm panel is a member of a multicast group and conveying the IP address on the alarm network and the rbridge ID associated with the multicast group to which multicast packets will be directed. As has been discussed, multicast packets are typically directed to an IP address and a rbridge ID that are each not in use by any one device on a network.

At 2512, the network controller adds the IP address to which multicast packets will be directed to the IP address that is already assigned to a simulation of a network interface port maintained by the network controller to serve as an endpoint on the alarm network to which packets directed at the alarm panel may be sent on the alarm network. Thus, the network controller is caused to accept packets directed towards either the IP address assigned to its simulation of a network interface port or to the destination IP address for multicast packets of the multicast group.

At 2514, the network controller adds the corresponding rbridge ID to which the same multicast packets will be directed to the rbridge ID that is already assigned to the routing bridge of the network controller to serve as another identifier of a destination routing bridge to which packets directed at the alarm panel may be sent on the alarm network. Thus, the network controller's routing bridge is caused to convey frames to the simulation of a network interface port received in packets routed either towards the rbridge ID of the routing bridge or towards the rbridge ID of the multicast group.

At 2520, the network controller receives a multicast packet, and a check is made at 2530 as to whether the rbridge ID incorporated into the packet matches either the rbridge ID of the routing bridge or the rbridge ID of the multicast group. If there is no match at 2530, then the network controller may take no further action regarding that multicast packet beyond possibly relaying it to one or more other routing bridges of the alarm network. However, if there is a match, then the encapsulation is undone at 2532, and the multicast frame of the multicast packet is provided to the internal network switch of the network controller at 2534 through the simulated network interface port.

Figure 22:
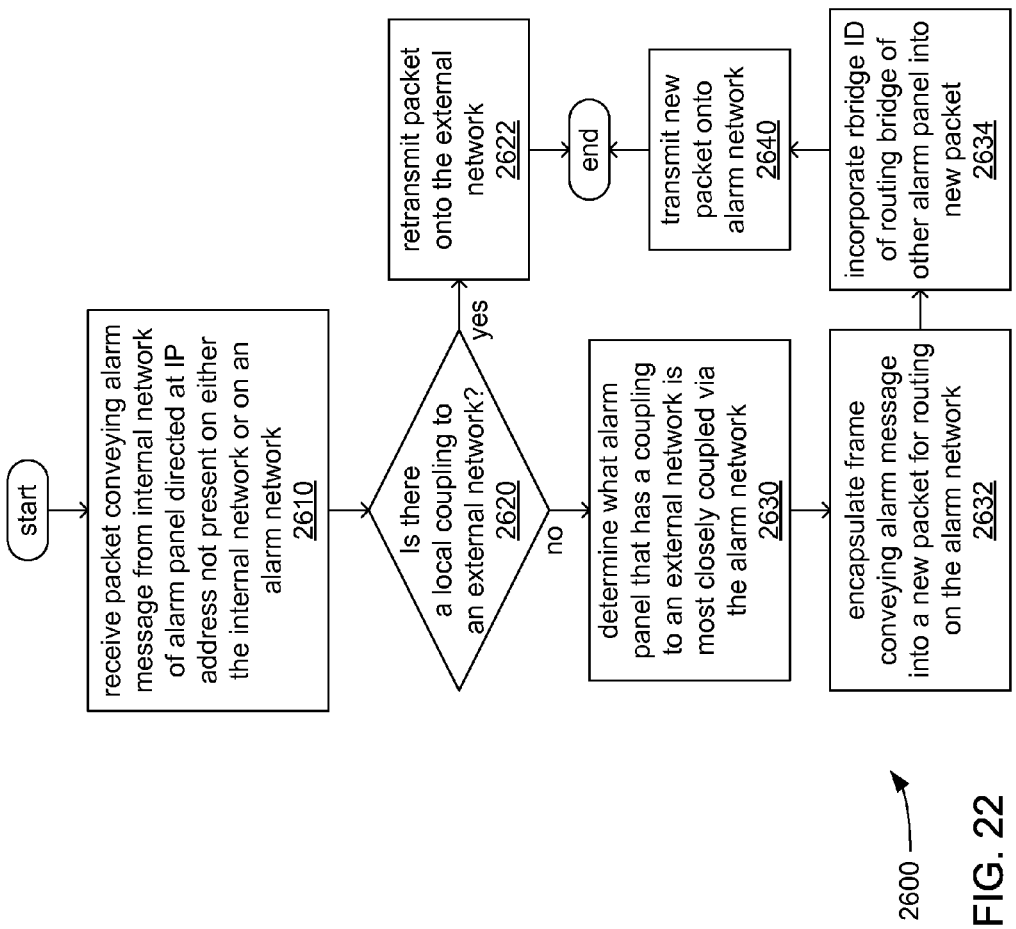

FIG. 22 illustrates an embodiment of a logic flow 2600. The logic flow 2600 may be representative of some or all of the operations executed by one or more embodiments described herein. More specifically, the logic flow 2600 may illustrate operations performed by logic of the network controller 500, possibly including hardware-based logic and/or logic implemented as instructions of the control routine 570 executed by the processor component 550.

At 2610, a network controller of an alarm panel of an alarm system (e.g., the network controller 500 of one of the alarm panels 1000a-f of the alarm system 5000) receives a packet conveying an alarm message via an internal network of the alarm panel (e.g., the internal network 599) directed to an IP address that is not in use on either the internal network or an alarm network of the alarm system (e.g., the alarm network 1999). At 2620, a check is made as to whether the network controller is directly coupled to an external network (e.g., the external network 9999). If the network controller is coupled directly to an external network, then the network controller retransmits the packet onto that external network at 2622.

However, if the network controller is not coupled directly to an external network, then the network controller determines at 2630 what other alarm panel is most closely coupled to the alarm panel via the alarm network that is also directly coupled to an external network. As has been discussed, the alarm controller may retrieve data concerning the topology of the alarm network that has been built up from data received from the network controllers of other alarm panels on the alarm network via use of a form of the IS-IS protocol.

At 2632, the alarm message is encapsulated into a new packet for transmission on the alarm network, and the rbridge ID of the routing bridge of the network controller that is most closely coupled via the alarm network and that has a direct coupling to an external network is incorporated into the new packet at 2634. At 2640, the new packet is transmitted onto the alarm network.

With the incorporation of the routing bridge 571 into the network controller 500 of each of the alarm panels 1000a-f, the work of installing the alarm system 5000 is made easier inasmuch as less technical skill is required on the part of installation personnel. As has been discussed, any conceivable topology for the alarm network 1999 can be accommodated, allowing the point-to-point network segments between pairs of the routing bridges 571 of the network controllers 500 to routed in any way necessitated by physical obstacles of building structures and/or terrain between buildings. Installation personnel need only ensure that each of the network controllers 500 is coupled by at least two network segments to at least two other network controllers 500 to form the alarm network 1999 with sufficient redundancy to maintain operation in the event that one of those network segments fails. Installation personnel need not be trained to plan a particular shape of topology (e.g., a ring topology) and they need not be trained to select locations at which to split a topology into two or more smaller topologies (e.g., split a ring topology into two or more ring topologies) as a result of simply adding another alarm panel to an existing alarm network.

With the incorporation of the combination of the routing bridge 571, the network address translator 5753 and the node proxy server 5757, the control routine 170 executed by the processor component 150 of the alarm controller 100 need not be written to deal with the complexities of accessing other alarm panels at their locally connected points through an alarm network that allows those other alarm panels to be coupled in any conceivable topology, and need not be written to detect individual IP addresses for each of those other alarm panels. The alarm controller 100 is able to access all of those other alarm panels through node proxies available at a single common IP address and selectable by specifying their node numbers, node names and/or serial numbers. In some embodiments, the single common IP address is the same IP address given by the alarm controller 100 to the network controller 500, and therefore, this IP address is already known to the alarm controller 100, and the processor component 150 is therefore not required to engage in a procedure to query for or otherwise detect or determine it. Further, the task of recurringly monitoring the alarm network 1999 for changes in the presence or "attendance" of other alarm panels on the alarm network 1999 is performed by the network controller 500 via recurring queries and/or monitoring the results of attempts to communicate with the other alarm panels, thereby freeing the alarm controller from doing so and further reducing the complexity of the control routine 170.

With the side-by-side presentation on the local network 599 of node and address proxies for each of the other alarm panels, the network controller 500 provides mechanisms by which network traffic of the alarm controller 100 related to the monitoring for and responding to of alarm conditions is kept separate from other network traffic of a less critical nature. With the further provision of the traffic controller 5758 to prioritize network traffic based at least on whether it is associated with node proxies used by the alarm controller 100 or address proxies used by other devices, the network controller 500 is able to give higher priority to ensuring that network traffic related to the monitoring for and responding to of alarm conditions is conveyed across the alarm network 1999 without undue interruption or delay caused by other less critical network traffic.

With the use of the processor component 550 of the network controller to implement the routing bridge 571 entirely separately from the use of the processor component 150 to monitor for and respond to alarm conditions related to locally coupled points, the network controller 500 remains capable of participating in the routing of messages conveying packets on the alarm network 1999 even if the alarm controller 100 local to it should malfunction. This provides another degree of redundancy in the operation of the alarm network 1999.

Generally, various elements of devices described herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The invention claimed is:

1. An alarm panel comprising:
an alarm controller configured to monitor one or more points for an indication of an alarm condition; and
a network controller comprising:
a proxy server configured to present multiple proxies on an internal network and to receive multiple unicast packets, each of the multiple proxies associated with an alarm panel of multiple alarm panels and each unicast packet of the multiple unicast packets directed to one of the proxies of the multiple proxies; and
a multicast component configured to combine the multiple unicast packets received from the alarm controller and destined to other alarm panels within a specified interval of time into a multicast frame.

2. The alarm panel of claim 1, further comprising a routing bridge configured to: encapsulate the multicast frame and send it to defined routing bridge groups;
incorporate an rbridge identifier of a multicast group into the multicast frame, the rbridge identifier associated with multiple routing bridges of at least a subset of alarm panels of the multiple alarm panels; and
route the multicast frame towards at least one other routing bridge of the multiple routing bridges via an alarm network.

3. The alarm panel of claim 2, wherein the routing bridge is configured to receive data from the at least one other routing bridge indicative of connections of the at least one other routing bridge and an rbridge identifier associated with the at least one other routing bridge.

4. The alarm panel of claim 2, wherein the routing bridge is compliant with a specification for TRILL.

5. The alarm panel of claim 2, wherein the routing bridge is configured to cooperate with the at least one other routing bridge to support the alarm network having any of a star topology, a ring topology or a mesh topology.

6. The alarm panel of claim 2, wherein the network controller comprises a port simulator configured to:
provide a virtual network interface port interposed between the proxy server and the routing bridge;
provide the virtual network interface port an IP address designated as a destination for unicast packets received from the alarm network; and
accept multicast packets directed to an IP group address.

7. The alarm panel of claim 1, wherein the multicast component is configured to:
receive data indicating multiple node identifiers, each node identifier of the multiple node identifiers associated with an alarm panel of the multiple alarm panels;
derive multiple IP addresses from the multiple node identifiers, each IP address operative to access an alarm panel of the multiple alarm panels via the alarm network; and
transmit to the multiple IP addresses an indication to the multiple alarm panels of the inclusion of each of the alarm panels of the multiple alarm panels in a multicast group.

8. The alarm panel of claim 1, wherein the multicast component is configured to select the multiple unicast packets based on receipt of the multiple unicast packets within a specified interval of time.

9. The alarm panel of claim 8, wherein the multicast component is configured to maintain an order in which the multiple unicast packets were received by the proxy server.

10. The alarm panel of claim 1, wherein the one or more points comprises at least one of a smoke detector, a heat detector or a fire pull switch.

11. An alarm panel comprising:
an alarm controller configured to monitor one or more points for an indication of an alarm condition; and
a network controller comprising
a first routing bridge configured to couple the alarm controller to an alarm network and determine an rbridge identifier of a second routing bridge that is most closely coupled to the first routing bridge through the alarm network and that is associated with another network controller that is coupled to an external network.

12. The alarm panel of claim 11, wherein the network controller further comprises a pass-thru component configured to monitor an internal network for a first packet directed to an IP address that is not in use on the internal network and not in use on an alarm network, and to convey contents of the first packet to the routing bridge based on whether the network controller is coupled to an external network.

13. The alarm panel of claim 12, wherein the routing bridge is configured to:

encapsulate the contents of the first packet in a second packet;

incorporate the rbridge identifier into the second packet; and route the second packet to the second routing bridge via the alarm network.

14. The alarm panel of claim 13, wherein the first routing bridge is configured to receive data from the second routing bridge indicative of connections of the second routing bridge and the rbridge identifier.

15. The alarm panel of claim 12, further comprising an external message controller configured to transmit the first packet to the network controller based an indication of an alarm condition via the internal network.

16. The alarm panel of claim 15, wherein the IP address is selected to direct the contents of the first packet to a remote computing device outside the alarm network through an external network.

17. The alarm panel of claim 16, wherein the external network comprises the Internet.

18. The alarm panel of claim 12, wherein the first routing bridge is configured to:

receive a second packet encapsulating a frame directed to an IP address that is not in use on the internal network and not in use on the alarm network;

undo encapsulation of the frame and convey the frame to the pass-thru component based on whether a rbridge identifier incorporated into the second packet identifies the first routing bridge as a destination of the second packet.

19. The alarm panel of claim 18, wherein the pass-thru component is configured to convey the frame to the external network as a third packet.

20. A computer-implemented method comprising:

receiving at a network controller an indication of membership of multiple alarm panels accessible via an alarm network in a multicast group;

receiving at the network controller multiple unicast packets from an alarm controller via an internal network, each unicast packet of the multiple unicast packets directed to one of the alarm panels of the multiple alarm panels; and combining the multiple unicast packets received from the alarm controller within a specified interval of time into a multicast frame.

21. The computer-implemented method of claim 20 comprising:

encapsulating the multicast frame into a multicast packet;

incorporating a rbridge identifiers of a multicast group into the multicast packet, the rbridge identifier associated with multiple routing bridges of at least a subset of alarm panels of the multiple alarm panels; and routing the multicast packet towards at least one routing bridge of the multiple routing bridges via the alarm network.

22. The computer-implemented method of claim 21 comprising receiving at the network controller the rbridge identifier.

23. The computer-implemented method of claim 20 comprising:

providing a virtual network interface port with an IP address designated as a destination for multicast packets received from the alarm network; and accepting multicast packets directed to the IP address at the network controller.

24. The computer-implemented method of claim 20 comprising:

receiving at the network controller data indicating multiple node identifiers, each node identifier of the multiple node identifiers associated with an alarm panel of the multiple alarm panels;

deriving multiple IP addresses from the multiple node identifiers, each IP address operative to access an alarm panel of the multiple alarm panels via the alarm network; and transmitting to the multiple IP addresses on the alarm network an indication to the multiple alarm panels of the inclusion of each of the alarm panels of the multiple alarm panels in a multicast group.

* * * * *